(12) United States Patent
Valverde, Jr. et al.

(10) Patent No.: US 11,049,047 B2
(45) Date of Patent: Jun. 29, 2021

(54) MULTIATTRIBUTE TRAVEL BOOKING PLATFORM

(71) Applicant: Amgine Technologies (US), Inc., Dover, DE (US)

(72) Inventors: L. James Valverde, Jr., Washington, DC (US); Jonathan David Miller, Toronto (CA); Harold Roy Miller, Toronto (CA)

(73) Assignee: Amgine Technologies (US), Inc., Dover, DE (US)

( * ) Notice: Subject to any disclaimer, the term of this patent is extended or adjusted under 35 U.S.C. 154(b) by 0 days.

(21) Appl. No.: 14/750,841

(22) Filed: Jun. 25, 2015

(65) Prior Publication Data

US 2016/0379142 A1 Dec. 29, 2016

(51) Int. Cl.
G06Q 10/02 (2012.01)
(52) U.S. Cl.
CPC .................................. G06Q 10/025 (2013.01)
(58) Field of Classification Search
CPC ................................................... G06Q 10/025
See application file for complete search history.

(56) References Cited

U.S. PATENT DOCUMENTS

| 5,557,524 | A | | 9/1996 | Maki |
| 5,797,127 | A | | 8/1998 | Walker et al. |
| 5,832,452 | A | * | 11/1998 | Schneider ............. G06Q 10/00 705/5 |
| 5,948,040 | A | | 9/1999 | DeLorme et al. |
| 6,059,724 | A | | 5/2000 | Campell et al. |
| 6,275,808 | B1 | | 8/2001 | DeMarcken |

(Continued)

FOREIGN PATENT DOCUMENTS

| CA | 2830228 C | 8/2017 |
| CA | 2830224 C | 12/2017 |

(Continued)

OTHER PUBLICATIONS

PR Newswire, "GetGoing Launches Multi-Supplier Hotel Merchandising Platform: BCD Travel Signs Multi-Year Agreement to Streamline Hotel Booking for Travel Management Companies," New York, PR Newswire Association LLC, Sep. 23, 2014.*

(Continued)

*Primary Examiner* — Nathan Erb
(74) *Attorney, Agent, or Firm* — Dickinson Wright PLLC

(57) ABSTRACT

A method for facilitating travel reservations is presented. The method may commence with receiving a travel related query. Upon receiving the travel related query, an attribute set relevant to the travel related query may be ascertained. The method may continue with parsing the travel related query to derive attribute values related to the attribute set. Upon parsing, at least one attribute of the attribute set may be initiated with the derived attribute values. The method may include ranking the at least one attribute based on user preferences and assigning weights to the at least one attribute based on the ranking to create at least one weighted attribute. The method may continue with searching for feasible travel itineraries. The feasible travel itineraries may be scored based on the at least one weighted attribute. At least one travel itinerary selected based on the scoring may be presented to a user.

14 Claims, 8 Drawing Sheets

(56) References Cited

U.S. PATENT DOCUMENTS

| | | |
|---|---|---|
| 6,477,520 B1 | 11/2002 | Malaviya et al. |
| 6,553,310 B1 | 4/2003 | Lopke |
| 6,795,710 B1 | 9/2004 | Creemer |
| 7,092,892 B1 | 8/2006 | Sobalvarro et al. |
| 7,219,073 B1 | 5/2007 | Taylor et al. |
| 7,286,998 B2 | 10/2007 | Sauser et al. |
| 7,302,398 B2 | 11/2007 | Ban et al. |
| 7,860,808 B2 | 12/2010 | Peters |
| 7,912,734 B2 | 3/2011 | Kil |
| 7,979,457 B1 | 7/2011 | Garman |
| 7,983,956 B1 | 7/2011 | Goel |
| 8,005,685 B1 | 8/2011 | Bird |
| 8,035,511 B2 | 10/2011 | Weaver et al. |
| 8,165,920 B2 | 4/2012 | Goel |
| 8,224,665 B2 | 7/2012 | Morris |
| 8,332,247 B1 | 12/2012 | Bailey et al. |
| 8,510,133 B2 | 8/2013 | Peak et al. |
| 8,600,784 B1 | 12/2013 | Ivey et al. |
| 8,631,007 B1 | 1/2014 | Blandford et al. |
| 8,762,160 B2 | 6/2014 | Lulla |
| 9,031,853 B2 | 5/2015 | Bartfeld et al. |
| 9,043,151 B2 | 5/2015 | Cai |
| 9,286,629 B2 | 3/2016 | Miller et al. |
| 9,449,151 B2 | 9/2016 | Etchegoyen |
| 9,659,099 B2 | 5/2017 | Miller et al. |
| 10,041,803 B2 | 8/2018 | Miller et al. |
| 10,078,855 B2 | 9/2018 | Miller et al. |
| 10,210,270 B2 | 2/2019 | Miller et al. |
| 10,275,810 B2 | 4/2019 | Miller et al. |
| 10,282,797 B2 | 5/2019 | Valverde, Jr. et al. |
| 2001/0044788 A1 | 11/2001 | Demir et al. |
| 2002/0069133 A1 | 6/2002 | Currie et al. |
| 2002/0082877 A1 | 6/2002 | Schiff et al. |
| 2002/0147619 A1* | 10/2002 | Floss ............... G06Q 10/02 705/5 |
| 2002/0178034 A1 | 11/2002 | Gardner et al. |
| 2003/0018499 A1 | 1/2003 | Miller et al. |
| 2003/0023463 A1 | 1/2003 | Dombroski et al. |
| 2003/0050846 A1 | 3/2003 | Rodon |
| 2003/0055690 A1 | 3/2003 | Garback |
| 2003/0055772 A1 | 3/2003 | Goldstein |
| 2003/0135458 A1 | 7/2003 | Tadano et al. |
| 2003/0177044 A1 | 9/2003 | Sokel et al. |
| 2003/0217052 A1 | 11/2003 | Rubenczyk et al. |
| 2004/0002876 A1 | 1/2004 | Sommers et al. |
| 2004/0044516 A1* | 3/2004 | Kennewick .......... G10L 15/22 704/5 |
| 2004/0078213 A1* | 4/2004 | Brice ............... G06Q 10/02 705/5 |
| 2004/0111255 A1 | 6/2004 | Huerta et al. |
| 2004/0220854 A1 | 11/2004 | Postrel |
| 2004/0249680 A1 | 12/2004 | Liew et al. |
| 2005/0033614 A1 | 2/2005 | Lettovsky et al. |
| 2005/0038644 A1 | 2/2005 | Napper et al. |
| 2005/0043940 A1 | 2/2005 | Elder |
| 2005/0108068 A1 | 5/2005 | Marcken et al. |
| 2005/0220278 A1 | 10/2005 | Zirngibl et al. |
| 2005/0267651 A1 | 12/2005 | Arango et al. |
| 2005/0288973 A1 | 12/2005 | Taylor et al. |
| 2006/0106655 A1 | 5/2006 | Lettovsky et al. |
| 2006/0178931 A1 | 8/2006 | Horn |
| 2006/0241983 A1 | 10/2006 | Viale et al. |
| 2006/0247954 A1 | 11/2006 | Hunt |
| 2006/0265508 A1 | 11/2006 | Angel et al. |
| 2006/0285662 A1 | 12/2006 | Yin et al. |
| 2006/0293930 A1 | 12/2006 | Rodgers et al. |
| 2007/0073563 A1 | 3/2007 | Dourthe et al. |
| 2007/0100962 A1 | 5/2007 | Barth et al. |
| 2007/0106497 A1 | 5/2007 | Ramsey et al. |
| 2007/0106536 A1 | 5/2007 | Moore |
| 2007/0143154 A1 | 6/2007 | Ashby et al. |
| 2007/0156469 A1 | 7/2007 | Bird et al. |
| 2007/0168245 A1 | 7/2007 | de Marcken et al. |
| 2007/0174350 A1 | 7/2007 | Pell et al. |
| 2007/0192186 A1 | 8/2007 | Greene et al. |
| 2007/0198442 A1 | 8/2007 | Horn |
| 2007/0203735 A1 | 8/2007 | Ashton |
| 2007/0208503 A1 | 9/2007 | Harnsberger |
| 2007/0260495 A1 | 11/2007 | Mace et al. |
| 2007/0276595 A1 | 11/2007 | Lewinson et al. |
| 2007/0294149 A1 | 12/2007 | Lu et al. |
| 2008/0021748 A1 | 1/2008 | Bay et al. |
| 2008/0046274 A1 | 2/2008 | Geelen et al. |
| 2008/0052217 A1 | 2/2008 | Etkin |
| 2008/0059454 A1 | 3/2008 | Andrieu |
| 2008/0091525 A1 | 4/2008 | Kretz |
| 2008/0091557 A1 | 4/2008 | Cella et al. |
| 2008/0103949 A1 | 5/2008 | Lobana et al. |
| 2008/0109232 A1 | 5/2008 | Musgrove et al. |
| 2008/0114623 A1 | 5/2008 | Berthaud et al. |
| 2008/0120306 A1 | 5/2008 | Panabaker et al. |
| 2008/0201178 A1 | 8/2008 | Vizitei |
| 2008/0319803 A1 | 12/2008 | Heyraud et al. |
| 2009/0005650 A1 | 1/2009 | Angell et al. |
| 2009/0006143 A1 | 1/2009 | Orttung et al. |
| 2009/0048876 A1 | 2/2009 | Bonissone et al. |
| 2009/0063359 A1 | 3/2009 | Connors |
| 2009/0070322 A1 | 3/2009 | Salvetti et al. |
| 2009/0112639 A1 | 4/2009 | Robinson |
| 2009/0157312 A1 | 6/2009 | Black et al. |
| 2009/0157664 A1 | 6/2009 | Wen |
| 2009/0177651 A1 | 7/2009 | Takamatsu et al. |
| 2009/0210262 A1 | 8/2009 | Rines et al. |
| 2009/0216633 A1 | 8/2009 | Whitsett |
| 2009/0234681 A1 | 9/2009 | Champernowne |
| 2009/0240517 A1* | 9/2009 | Pelter ............... G06Q 30/0278 705/306 |
| 2009/0319305 A1 | 12/2009 | Weissert et al. |
| 2009/0327148 A1 | 12/2009 | Kamar et al. |
| 2010/0010841 A1 | 1/2010 | Cooper et al. |
| 2010/0010978 A1* | 1/2010 | Carapella ........... G06F 16/2425 707/E17.014 |
| 2010/0030594 A1 | 2/2010 | Swart |
| 2010/0082241 A1 | 4/2010 | Trivedi |
| 2010/0153292 A1 | 6/2010 | Zheng et al. |
| 2010/0217680 A1 | 8/2010 | Fusz et al. |
| 2010/0217723 A1 | 8/2010 | Sauerwein, Jr. et al. |
| 2010/0318386 A1 | 12/2010 | Vaughan et al. |
| 2010/0324927 A1 | 12/2010 | Tinsley |
| 2011/0046989 A1 | 2/2011 | Crean et al. |
| 2011/0093361 A1 | 4/2011 | Morales |
| 2011/0125578 A1 | 5/2011 | Alspector |
| 2011/0137766 A1 | 6/2011 | Rasmussen et al. |
| 2011/0153373 A1 | 6/2011 | Dantzig et al. |
| 2011/0167003 A1 | 7/2011 | Nice et al. |
| 2011/0231182 A1 | 9/2011 | Weider et al. |
| 2011/0246246 A1 | 10/2011 | Johnson |
| 2011/0295692 A1 | 12/2011 | Zivkovic et al. |
| 2011/0307241 A1 | 12/2011 | Waibel et al. |
| 2011/0307280 A1 | 12/2011 | Mandelbaum |
| 2011/0312870 A1 | 12/2011 | Beatty |
| 2012/0036158 A1 | 2/2012 | Cahill et al. |
| 2012/0054001 A1 | 3/2012 | Zivkovic et al. |
| 2012/0059679 A1 | 3/2012 | de Marcken et al. |
| 2012/0209517 A1 | 8/2012 | Li et al. |
| 2012/0233207 A1 | 9/2012 | Mohajer |
| 2012/0239440 A1 | 9/2012 | Miller et al. |
| 2012/0239443 A1* | 9/2012 | Miller ............... G06F 17/2785 705/6 |
| 2012/0239455 A1 | 9/2012 | Crean et al. |
| 2012/0239584 A1 | 9/2012 | Yariv et al. |
| 2012/0239669 A1 | 9/2012 | Miller et al. |
| 2012/0259667 A1 | 10/2012 | Pelissier et al. |
| 2012/0265598 A1 | 10/2012 | Krone |
| 2012/0330982 A1* | 12/2012 | Arnaud ............... G06F 16/951 707/755 |
| 2013/0166329 A1 | 1/2013 | Amoux-Prost et al. |
| 2013/0041696 A1 | 2/2013 | Richard |
| 2013/0041902 A1 | 2/2013 | Swann et al. |
| 2013/0054375 A1 | 2/2013 | Sy et al. |
| 2013/0073323 A1 | 3/2013 | Zacharia et al. |
| 2013/0073325 A1* | 3/2013 | Ross ............................ 705/6 |
| 2013/0090959 A1 | 4/2013 | Kvamme et al. |
| 2013/0096965 A1 | 4/2013 | Pappas et al. |

(56) References Cited

U.S. PATENT DOCUMENTS

| | | |
|---|---|---|
| 2013/0132129 A1 | 5/2013 | Fox et al. |
| 2013/0151291 A1 | 6/2013 | Salway |
| 2013/0158821 A1 | 6/2013 | Ricci |
| 2013/0159023 A1 | 6/2013 | Srinivas et al. |
| 2013/0198036 A1 | 8/2013 | Pappas et al. |
| 2013/0304349 A1 | 11/2013 | Davidson |
| 2013/0339105 A1 | 12/2013 | Russell et al. |
| 2014/0012659 A1 | 1/2014 | Yan |
| 2014/0019176 A1 | 1/2014 | Mandelbaum |
| 2014/0025540 A1 | 1/2014 | Hendrickson |
| 2014/0074746 A1 | 3/2014 | Wang |
| 2014/0089020 A1* | 3/2014 | Murphy .......................... 705/5 |
| 2014/0089036 A1 | 3/2014 | Chidlovskii |
| 2014/0089101 A1 | 3/2014 | Meller |
| 2014/0114705 A1 | 4/2014 | Bashvitz et al. |
| 2014/0156411 A1 | 6/2014 | Murgai |
| 2014/0229102 A1 | 8/2014 | Bapna et al. |
| 2014/0257949 A1 | 9/2014 | Gishen |
| 2014/0279196 A1 | 9/2014 | Wilson et al. |
| 2014/0330605 A1 | 11/2014 | Connolly et al. |
| 2014/0330606 A1 | 11/2014 | Paget et al. |
| 2014/0330621 A1 | 11/2014 | Nichols et al. |
| 2014/0337063 A1 | 11/2014 | Nelson et al. |
| 2015/0012309 A1 | 1/2015 | Buchheim et al. |
| 2015/0012467 A1* | 1/2015 | Greystoke .............. G06N 20/00 706/12 |
| 2015/0046201 A1 | 2/2015 | Miller et al. |
| 2015/0066594 A1 | 3/2015 | Li et al. |
| 2015/0066830 A1 | 3/2015 | Wilson et al. |
| 2015/0193583 A1 | 7/2015 | McNair et al. |
| 2015/0227633 A1* | 8/2015 | Shapira ................. G06F 16/338 707/706 |
| 2015/0235478 A1 | 8/2015 | Blandin et al. |
| 2015/0242927 A1* | 8/2015 | Will ................... G06Q 30/0629 705/26.64 |
| 2015/0278970 A1 | 10/2015 | Valverde, Jr. et al. |
| 2015/0356262 A1 | 12/2015 | Liebovitz et al. |
| 2016/0048928 A1 | 2/2016 | Davis et al. |
| 2016/0125559 A1 | 5/2016 | Shekou |
| 2016/0162871 A1 | 6/2016 | Lee |
| 2016/0196271 A1 | 7/2016 | Miller et al. |
| 2016/0202073 A1 | 7/2016 | Claycomb et al. |
| 2016/0203422 A1 | 7/2016 | Demarchi et al. |
| 2016/0232626 A1 | 8/2016 | Geraci et al. |
| 2016/0258767 A1 | 9/2016 | Nevrekar et al. |
| 2016/0364815 A1 | 12/2016 | Miller et al. |
| 2016/0370197 A1 | 12/2016 | Miller et al. |
| 2016/0371799 A1 | 12/2016 | Miller et al. |
| 2017/0293722 A1 | 10/2017 | Valverde, Jr. et al. |
| 2017/0316103 A1 | 11/2017 | Miller et al. |
| 2018/0336642 A1 | 11/2018 | Miller |
| 2018/0347995 A1 | 12/2018 | Valverde, Jr. et al. |
| 2019/0012712 A1 | 1/2019 | Miller et al. |
| 2019/0122315 A1 | 4/2019 | Valverde, Jr. et al. |
| 2019/0179863 A1 | 6/2019 | Miller et al. |
| 2019/0251643 A1 | 8/2019 | Valverde, Jr. et al. |
| 2020/0027039 A1 | 1/2020 | Miller et al. |

FOREIGN PATENT DOCUMENTS

| | | |
|---|---|---|
| WO | WO2012125742 | 9/2012 |
| WO | WO2012125753 | 9/2012 |
| WO | WO2012125761 | 9/2012 |
| WO | WO2015021180 | 2/2015 |
| WO | WO2015153776 A1 | 10/2015 |
| WO | WO2016201134 A1 | 12/2016 |
| WO | WO2016205076 A1 | 12/2016 |
| WO | WO2016205280 A1 | 12/2016 |
| WO | WO2016209679 A1 | 12/2016 |
| WO | WO2017180483 A1 | 10/2017 |

OTHER PUBLICATIONS

Non-Final Office Action, dated Mar. 11, 2015, U.S. Appl. No. 13/420,433, filed Mar. 14, 2012.

Final Office Action, dated Jul. 2, 2015, U.S. Appl. No. 13/420,433, filed Mar. 14, 2012.

Non-Final Office Action, dated Dec. 16, 2013, U.S. Appl. No. 13/419,989, filed Mar. 14, 2012.

Final Office Action, dated Jul. 1, 2014, U.S. Appl. No. 13/419,989, filed Mar. 14, 2012.

Non-Final Office Action, dated Dec. 5, 2014, U.S. Appl. No. 13/419,989, filed Mar. 14, 2012.

Final Office Action, dated Jun. 25, 2015, U.S. Appl. No. 13/419,989, filed Mar. 14, 2012.

Non-Final Office Action, dated Oct. 21, 2014, U.S. Appl. No. 13/420,179, filed Mar. 14, 2012.

Final Office Action, dated Mar. 5, 2015, U.S. Appl. No. 13/420,179, filed Mar. 14, 2012.

Advisory Action, dated May 21, 2015, U.S. Appl. No. 13/420,179, filed Mar. 14, 2012.

International Search Report and Written Opinion dated Jun. 15, 2012 in Patent Cooperation Treaty application No. PCT/US2012/029121, filed Mar. 14, 2012.

International Search Report and Written Opinion dated Jun. 7, 2012 in Patent Cooperation Treaty application No. PCT/US2012/029098, filed Mar. 14, 2012.

International Search Report and Written Opinion dated Mar. 14, 2013 in Patent Cooperation Treaty application No. PCT/US2012/029112, filed Mar. 14, 2012.

International Search Report and Written Opinion dated Nov. 24, 2014 in Patent Cooperation Treaty application No. PCT/US2014/049979, filed Aug. 6, 2014.

United Hub. "FareLock: An Opportunity to Lock in Your Ticket Price for up to Seven Days." United Hub. Aug. 17, 2012. Retrieved on Oct. 17, 2014 from Internet URL <https://hub.united.com/en-us/news/products-services/pages/farelock-lets-you-lock-in-your-ticket-price.aspx>.

MacKenzie, Scott. "Two Services Help You Lock in a Good Deal on Airfare." Hack My Trip. Apr. 2014. Retrieved on Oct. 17, 2014 from Internet URL <http://hackmytrip.com/2014/04/two-services-help-lock-good-deal-airfare/>.

Boardman, Al. "Options Away." Vimeo. May 24, 2013. Retrieved on Oct. 17, 2014 from Internet URL <http://vimeo.com/66936261>.

International Search Report and Written Opinion dated Jul. 2, 2015 in Patent Cooperation Treaty application No. PCT/US2015/023901, filed Apr. 1, 2015.

Office Action dated Feb. 26, 2016 in Canadian Patent Application No. 2830228 filed Sep. 13, 2013.

"Office Action," Canadian Patent Application No. 2830224, dated May 18, 2016, 6 pages.

"Office Action," Canadian Patent Application No. 2830229, dated May 19, 2016, 4 pages.

"International Search Report" and "Written Opinion," Patent Cooperation Treaty application No. PCT/US2016/037555, dated Jul. 11, 2016, 13 pages.

"International Search Report" and "Written Opinion," Patent Cooperation Treaty application No. PCT/US2016/036760, dated Sep. 1, 2016, 12 pages.

"International Search Report" and "Written Opinion," Patent Cooperation Treaty application No. PCT/US2016/037503, dated Sep. 9, 2016, 10 pages.

"International Search Report" and "Written Opinion," Patent Cooperation Treaty application No. PCT/US2016/036749, dated Sep. 27, 2016, 13 pages.

"Notice of Allowance," Canadian Patent Application No. 2830228, dated Jan. 12, 2017, 1 page.

"Notice of Allowance," Canadian Patent Application No. 2830224, dated May 4, 2017, 1 page.

"Office Action," Canadian Patent Application No. 2830229, dated Apr. 28, 2017, 4 pages.

"International Search Report" and "Written Opinion," Patent Cooperation Treaty Application No. PCT/US2017/026708, dated Jul. 7, 2017, 13 pages.

(56) References Cited

OTHER PUBLICATIONS

Subramoni, Hari, "Topology-Aware MPI Communication and Scheduling for High Performance Computing Systems," Ohio State University, 2013, 151 pages.
Tablan, Valentin et al., "A Natural Language Query Interface to Structured Information," The Semantic Web: Research and Applications, ESWC 2008: Lecture Notes in Computer Science, vol. 5021, pp. 361-375.
United Airlines, "FareLock" webpage. Jul. 28, 2012. Retrieved from the Internet: <https://www.united.com/CMS/en-US/products/travel/products/Pages/FareLock.aspx> (http://web.archive.org/web/20120728071904/https://www.united.com/CMS/en-US/products/travelproducts/Pages/FareLock.aspx> captured on Jul. 28, 2012 using Wayback Machine), 4 pages.
Federal Trade Commission, "Using Layaway Plans" webpage. Dec. 19, 2012. Retrieved from the Internet: <htttps://www.consumer.ftc.gov/articles/0128-using-layaway-plans> (<http://web.archive.org/web/20121219044435/htttps://www.consumer.ftc.gov/articles/0128-using-layaway-plans> captured on Dec. 19, 2012 using Wayback Machine), 2 pages.
"Office Action," Canadian Patent Application No. 2944652, dated Feb. 27, 2019, 5 pages.
"Office Action," Canadian Patent Application No. 2830229, dated Mar. 1, 2019, 3 pages.
Mayerowitz "Latest Airline Fee: $9 to Lock in Airfare," ABC News [online], Dec. 13, 2010 (retrieved on Dec. 21, 2018], Retrieved from the Internet: <URL:http://web.archive.org/web/20110122133909/http://abcnews.go.com/Travel/airline-fees-forgot-checked-bags-paylock-airfare/story?id=12385126> 8 pages.
"Office Action," Canadian Patent Application No. 2830229, dated Mar. 16, 2018, 5 pages.
Goddeau, David et al., "Galaxy: A Human-Language Interface to On-Line Travel Information," 3rd International Conference on Spoken Language Processing (ICSLP 94), Yokohama, Japan, Sep. 18-22, 1994, pp. 707-710.
Non-final Office Action and Notice of References Cited dated Jun. 5, 2018 in U.S. Appl. No. 15/595,795 (14 pages).
Non-final Office Action and Notice of References Cited dated Feb. 26, 2016 in U.S. Appl. No. 13/420,433 (11 pages).
Notices of Allowance and References Cited dated Dec. 18, 2015 in U.S. Appl. No. 13/419,989 (15 pages).
Non-final Office Action dated Aug. 18, 2015 in U.S. Appl. No. 13/420,179 (11 pages).
Final Office Action dated Jan. 19, 2016 in U.S. Appl. No. 13/420,179 (11 pages).
Non-final Office Action and Notice of References Cited dated Aug. 14, 2015 in U.S. Appl. No. 14/676,302 (19 pages).
Final Office Action and Notice of References Cited dated Apr. 6, 2016 in U.S. Appl. No. 14/676,302 (26 pages).
Final Office Action and Notice of References Cited dated Jul. 11, 2016 in U.S. Appl. No. 13/420,433 (12 pages).
Non-final Office Action and Notice of References Cited dated Sep. 20, 2016 in U.S. Appl. No. 14/453,420 (29 pages).
Non-final Office Action and Notice of References Cited dated Nov. 30, 2016 in U.S. Appl. No. 14/676,302 (20 pages).
Non-final Office Action and Notice of References Cited dated Jul. 13, 2016 in U.S. Appl. No. 15/069,791 (12 pages).
Non-final Office Action and Notice of References Cited dated Jun. 22, 2016 in U.S. Appl. No. 13/420,179 (13 pages).
Final Office Action dated Feb. 1, 2017 in U.S. Appl. No. 13/420,179 (13 pages).
Non-final Office Action dated Oct. 27, 2017 in U.S. Appl. No. 13/420,179 (14 pages).
Final Office Action dated Mar. 28, 2018 in U.S. Appl. No. 13/420,179 (13 pages).
Notices of Allowance and References Cited dated Dec. 27, 2018 in U.S. Appl. No. 13/420,179 (13 pages).
Non-final Office Action dated Jun. 13, 2017 in U.S. Appl. No. 13/420,433 (12 pages).
Final Office Action dated Jan. 24, 2018 in U.S. Appl. No. 13/420,433 (13 pages).
Final Office Action dated Jun. 28, 2017 in U.S. Appl. No. 14/676,302 (25 pages).
Non-final Office Action and Notice of References Cited dated Apr. 24, 2018 in U.S. Appl. No. 14/676,302 (26 pages).
Final Office Action dated Oct. 4, 2018 in U.S. Appl. No. 14/676,302 (7 pages).
Non-final Office Action and Notice of References Cited dated Aug. 24, 2018 in U.S. Appl. No. 15/178,064 (30 pages).
Final Office Action and Notice of References Cited dated Feb. 19, 2019 in U.S. Appl. No. 15/178,064 (33 pages).
Non-final Office Action and Notice of References Cited dated Oct. 7, 2019 in U.S. Appl. No. 15/178,064 (44 pages).
Non-final Office Action and Notice of References Cited dated Sep. 26, 2017 in U.S. Appl. No. 15/178,453 (12 pages).
Non-final Office Action and Notice of References Cited dated Sep. 16, 2019 in U.S. Appl. No. 16/055,767 (7 pages).
Final Office Action and Notice of References Cited dated Apr. 18, 2017 in U.S. Appl. No. 14/453,420 (27 pages).
Non-final Office Action dated Mar. 9, 2018 in U.S. Appl. No. 14/453,420 (38 pages).
Final Office Action and Notice of References Cited dated Aug. 27, 2018 in U.S. Appl. No. 14/453,420 (45 pages).
Non-final Office Action and Notice of References Cited dated Jan. 7, 2019 in U.S. Appl. No. 14/453,420 (47 pages).
Final Office Action and Notice of References Cited dated Mar. 29, 2019 in U.S. Appl. No. 14/453,420 (44 pages).
Non-final Office Action and Notice of References Cited dated Jul. 12, 2018 in U.S. Appl. No. 15/183,620 (14 pages).
Non-Final Office Action and Notice of References Cited dated Nov. 29, 2018 in U.S. Appl. No. 15/183,620 (17 pages).
Non-final Office Action and Notice of References Cited dated May 22, 2019 in U.S. Appl. No. 15/183,620 (16 pages).
Non-final Office Action and Notice of References Cited dated Apr. 17, 2019 in U.S. Appl. No. 15/482,619 (42 pages).
Non-final Office Action and Notice of References Cited dated Apr. 14, 2020 in U.S. Appl. No. 15/979,275 (14 pages).
Non-final Office Action and Notice of References Cited dated May 28, 2020 in U.S. Appl. No. 16/142,834 (33 pages).
"Office Action," Canadian Patent Application No. 3021147, dated Jun. 3, 2019, 5 pages.
"Office Action," Canadian Patent Application No. 2989325, dated Jul. 26, 2019, 6 pages.
"Office Action," Canadian Patent Application No. 2944652, dated Dec. 30, 2019, 5 pages.

\* cited by examiner

MULTIATTRIBUTE TRAVEL BOOKING PLATFORM

TECHNICAL FIELD

The present disclosure relates to data processing and, more particularly, to facilitating travel reservations.

BACKGROUND

Travel consumers enjoy of a plurality of options. The travel market is replete with numerous sources providing travel-related information and advice on everything from destinations to hotels, related points of interest, and pricing data for a vast array of goods and services. While consumers can derive much utility from this choice environment enabled by online travel agencies (OTAs) and travel websites, a choice task of the travel consumer is often encumbered by information abundance and by legacy technology platforms that almost invariably complicate the consumer choice problem.

For the average consumer, these choice-related challenges can take many forms, which include a large number of viable itinerary options to sort through, evaluate, and ultimately choose from; disparate and non-homogenous information sources, all of which possess varying degrees of quality, usefulness, and reliability; and the need to consider complex value trade-offs among key choice attributes and objectives (e.g., price vs. suitability of a selected flight for the consumer), together with he existence of often conflicting objectives (e.g., a desire for luxury, constrained by willingness-to-pay).

To overcome the choice-related challenges, average consumers typically utilize a vast array of short-cuts and heuristics, all of which enable the consumer to sift through and evaluate numerous choice options, in ways that lead, ultimately, to choices that satisfy the consumer. However, existing OTA technology platforms do not always confront these challenges to consumer satisfaction. In other words, delivering travel booking capabilities to the consumer needs to be redesigned to improve the consumer experience during travel reservations.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one example embodiment of the disclosure, a system for facilitating travel reservations is provided. The system includes a processor, a parser in communication with the processor, and a scheduler in communication with the processor. The processor may be operable to receive a travel related query and ascertain an attribute set relevant to the travel related query. The processor may rank at least one attribute based on user preferences and assign weights to the at least one attribute based on the ranking to create at least one weighted attribute.

Furthermore, the processor may be operable to present at least one travel itinerary selected from feasible travel itineraries based on scoring. The parser may be operable to parse the travel related query to derive attribute values related to the attribute set and initiate the at least one attribute of the attribute set with the derived attribute values. The scheduler may be operable to search for the feasible travel itineraries based on the least one attribute and the user preferences and score the feasible travel itineraries based on the at least one weighted attribute for each of the feasible travel itineraries.

According to one example embodiment of the disclosure, a method for facilitating travel reservations is provided. The method may commence with receiving a travel related query. Upon receiving the travel related query, an attribute set relevant to the travel related query may be ascertained. The method may continue with parsing the travel related query to derive attribute values related to the attribute set. Upon the parsing, at least one attribute of the attribute set may be initiated with the derived attribute values. The method may further include ranking the at least one attribute based on user preferences. Furthermore, weights may be assigned to the at least one attribute based on the ranking to create at least one weighted attribute. The method may continue with searching for feasible travel itineraries based on the at least one attribute and the user preferences. The feasible travel itineraries may be scored based on the at least one weighted attribute for each of the feasible travel itineraries. At least one travel itinerary selected from the feasible travel itineraries based on the scoring may be presented.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
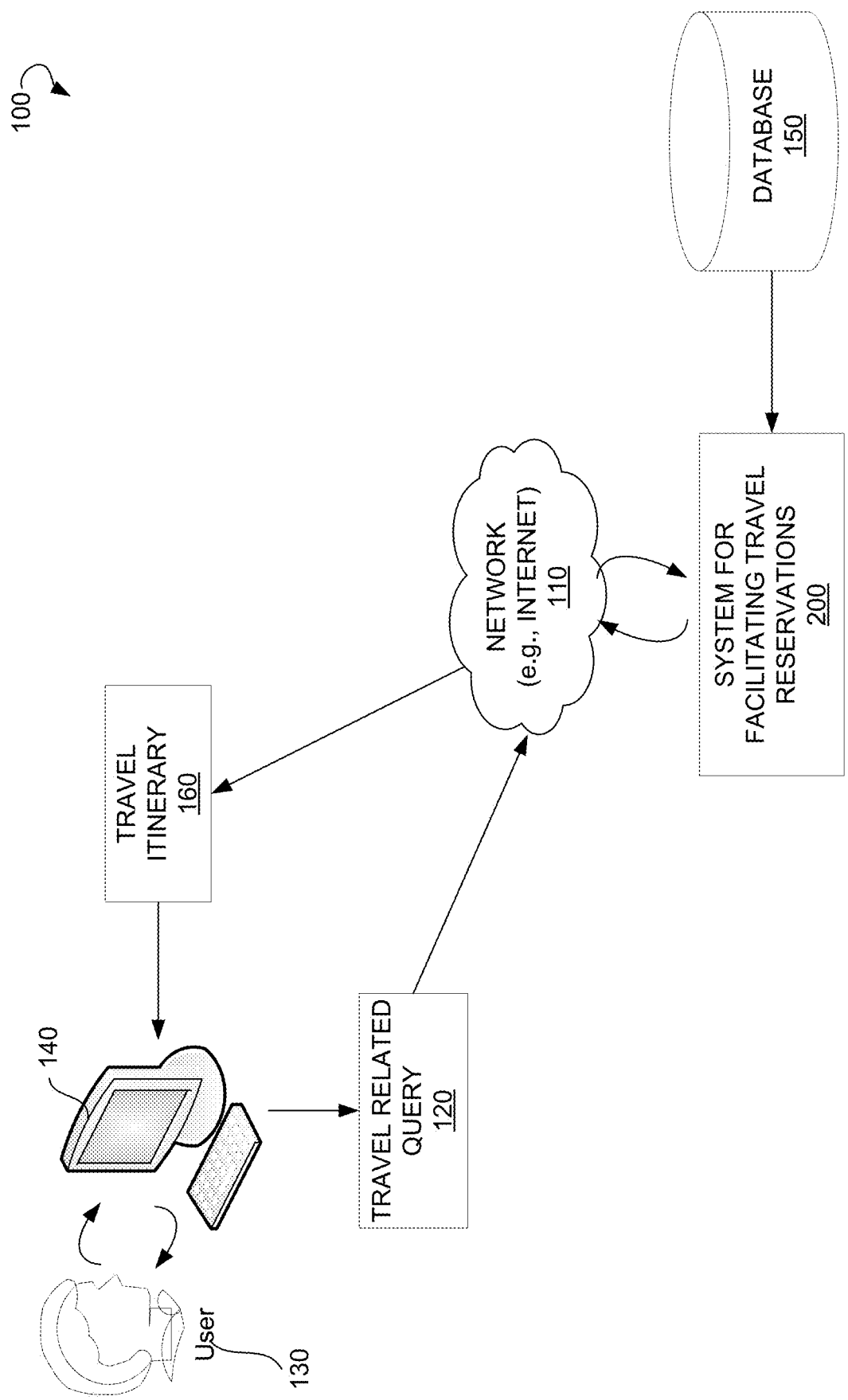
FIG. 1 illustrates an environment within which systems and methods for facilitating travel reservations can be implemented.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The disclosure relates to a multiattribute travel booking platform that can enable individual consumers to identify itinerary options that match preferences of the consumers while reducing search efforts. Additionally, the platform can simplify a choice task for a consumer and increase the quality of purchase decisions made via the platform. More specifically, upon receiving a travel related query from the consumer, the platform may analyze the travel related query to determine multiple attributes relating to itinerary options of the consumer. The attributes may have differing levels of importance for the consumer. Therefore, the platform may prioritize and rank the attributes based on consumer preferences. Based on the ranking, each of the attributes may be assigned a weight depending on an importance of this attribute for the consumer. The platform may perform a search for feasible travel itineraries. The weighted attributes may be used to score each of the feasible travel itineraries. The travel itineraries having the highest scores may be presented to the consumer in response to the travel related query.

While determining multiple attributes relevant to the travel related query, the platform may create a linkage between (i) natural language instantiation of itinerary-relevant attributes via parsing the travel related query; and (ii) consumer-specified preference information concerning relevant travel goods and services (e.g., airlines and hotels), which, for example, can be ascertained from a consumer account associated with the platform. The multiattribute travel booking platform can be based on the following principles.

Firstly, the platform is both intention- and preference-driven. The platform is developed at the very foundations of travel planning actions and travel-related consumption. The platform can therefore be capable of "understanding" travel-related requests in terms of the determinate goals and objectives of consumers, as well as include the ability to properly handle the logistics of travel. To the extent that it is possible for the platform to either "know" or infer the travel-related preferences of the consumer, the preferences may factor into how travel requests are ultimately serviced within the platform.

Secondly, a man-machine interface of the platform can enable specifying travel-related goals and objectives. For this purpose, the platform may use parsing of natural language of the travel related queries. Accordingly, the platform can enable the consumer to articulate/specify strategic intent via natural language queries, with the built-in intelligence to understand a robust travel lexicon.

Thirdly, the platform can be capable of supporting the complex logistics and scheduling of multi-passenger/multi-leg/multi-city itineraries. Existing OTA technologies are incapable of efficiently handling complex itinerary requests, involving multiple, perhaps geographically-distributed, travelers. In contrast, the platform may incorporate complex scheduling capabilities, enabling groups of travelers (e.g., business colleagues or families) to effectively plan and book travel.

Fourthly, the platform can possess true end-to-end integration, including fulfillment. A characteristic feature of many travel applications and web sites is the ability to move from search/research to booking/purchase within the application. The platform may have en suite capabilities that never require the consumer to exit the travel application environment prior to making a purchase decision, thereby providing the consumer with an immersive "all-in-one" experience from making a travel related query to purchasing tickets for travel.

Furthermore, interactivity and control can be built into the platform, and the consumer may be able to personalize aspects of the interactivity. The consumer can be able to define aspects of how the consumer interacts with and consumes travel content. The platform may therefore be capable of receiving requests of the consumer (in fact, capable of "listening" to the consumer), with the goal of finding satisfying solutions to articulated/stated goals and objectives, consistent with underlying preferences and consumer willingness-to-pay. Moreover, the platform may enable the consumer to amend/revise plans during searching for a requisite purchase decision.

Moreover, the platform may possess both stage and state awareness. More specifically, the platform may be operable to determine where the consumer is in the path-to-purchase. With this awareness, the platform may come to determining of information requirements and needs of the consumer.

Additionally, the platform may possess a purpose-built choice architecture that may provide the consumer with decision aiding capabilities. The goal is to provide the consumer with the most efficient route to a requisite or satisfying purchase decision.

Furthermore, the platform may incorporate journey management capabilities to enable the consumer to change elements of a travel itinerary. It is often the case that changes must be made to one or more aspects of a purchased travel itinerary—driven, for example, by endogenous reasons (e.g., the change of travel plans of the consumer) or by exogenous factors (e.g., extreme weather).

Additionally, the platform may be consumer-centric in both the design of the platform and how the platform acts in the marketplace, thereby maximizing the efficiency of the travel-buying experience. The goal of the platform is to deliver maximal personal utility to the travel consumer; the platform is therefore "utility-centric," as opposed to profit-centric.

Many of the core design elements and principles of the platform outlined above relate directly to how feasible travel requests can be identified and presented for consideration to the consumer. In this regard, the platform may tend to explore the manner in which choice is manifested within the platform. The more travel itinerary options that are presented to the consumer, the greater the chance that the consumer finds a travel itinerary that aligns with preferences of the consumer. Therefore, there is a tension between abundance of choice and choice burden for the consumer. At the same time, the presence of a plurality of options places a greater cognitive burden on the consumer, and this can lead to compromised decision quality and possibly sub-optimal outcomes. The platform may provide the balance between "richness of options" and "choice overload," along with considering conflicting objectives and values (e.g., a desire for luxury constrained by willingness-to-pay).

Thus, the platform has a choice architecture that pertains to how the choice task is structured, and how choice options are described or presented to the consumer. The choice architecture can be characterized by the following categories:

Logical/Rational Basis.

The knowledge, information, and preferences that factor into the travel itinerary selection process can be structured and evaluated in a transparent and rationally consistent manner. The logical basis may formally include multiple attributes in order to allow for proper trade-off analysis.

Speed and Efficiency.

The choice architecture can provide results and itinerary solutions within time-frames that are compatible with the OTA decision context (i.e., on the order of a few seconds). Information and analysis can be presented to the consumer in an efficient manner, minimizing search costs and conveying essential information in ways that enable rapid identification of minimal choice sets, from which final purchase decisions can be made.

Awareness of Cognitive Biases and Heuristics.

Consumers are known to invoke a number of heuristics and biases in evaluating travel options. For example, consumers can often perform an initial screening of options on the basis of some subset of total product attributes (e.g., cost), and then make alternative-based comparisons on the basis of the remaining attributes after the initial screening. Within the travel space, it is also not uncommon to see consumers use attribute information (e.g., seat choice) to predict their en route or ex post satisfaction. The choice task for the average travel consumer can be, in fact, replete with cognitive biases. As consumers are often inclined to accept and use information in the form in which they receive it, the choice architecture of the platform may present information to the consumer in ways that minimize the adverse effects of cognitive biases that can adversely impact decision quality and consumer satisfaction.

Visualization Capabilities.

It is important for consumers to be able to visualize the results of their travel queries in ways that ultimately maximize decisional efficiency. At a minimum, the visualization schemes may, when presenting two or more travel itinerary options, convey rank information as well as information concerning the cause of the rank. The platform is able to convey information about "performance" (namely, suitability of the travel itinerary based on customer preferences) vs. price by conveying maximal information to the consumer in an efficient and easy-to-understand manner. The interactive refinement and/or modification of travel search attributes is also a part of the decision aiding capabilities of the platform.

FIG. 1 illustrates an environment 100 within which the systems and methods for facilitating travel reservations can be implemented, in accordance with some embodiments. A travel related query 120 associated with a user 130 may be received, for example, via a user interface displayed on a user device 140. The travel related query 120 may include free text data. The free text data may be obtained as a natural language input by the user 130, by speech-to-text conversion of an oral exchange with the user 130, or otherwise. In some embodiments, the user 130 may be asked, in oral or written form, one or more motivating questions to receive relevant travel related query 120.

The travel related query 120 may be transmitted to the system 200 for facilitating travel reservations via a network 110. The network 110 may include the Internet or any other network capable of communicating data between devices. Suitable networks may include or interface with any one or more of, for instance, a local intranet, a Personal Area Network (PAN), a Local Area Network (LAN), a Wide Area Network (WAN), a Metropolitan Area Network (MAN), a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or an Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System (GPS), cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 110 may be a network of data processing nodes that are interconnected for the purpose of data communication. The network 110 may include any suitable number and type of devices (e.g., routers and switches) for forwarding commands, content, and/or web object requests from each client to the online community application and responses back to the clients.

The user device 140, in some example embodiments, may include a Graphical User Interface (GUI) for displaying the user interface associated with the system 200. In a typical GUI, instead of offering only text menus or requiring typed commands, the system 200 may present graphical icons, visual indicators, or special graphical elements called widgets that may be utilized to allow the user 130 to interact with the system 200. The user device 140 may be configured to utilize icons used in conjunction with text, labels, or text navigation to fully represent the information and actions available to the user 130.

The user device 140 may include a mobile telephone, a personal computer (PC), a lap top, a smart phone, a tablet PC, and so forth. The system 200 may be a server-based distributed application; thus it may include a central component residing on a server and one or more client applications residing on one or more user devices and communicating with the central component via the network 110. The user 130 may communicate with the system 200 via a client application available through the user device 140.

Travel itineraries available from the optional database 150 may be analyzed with reference to preferences of the user 130 and travel itineraries 160 suiting the preferences of the user 130 may be determined. Travel itineraries 160 may be presented to the user 130 by displaying travel itineraries 160 via the user interface on a screen of the user device 140.

Figure 2:
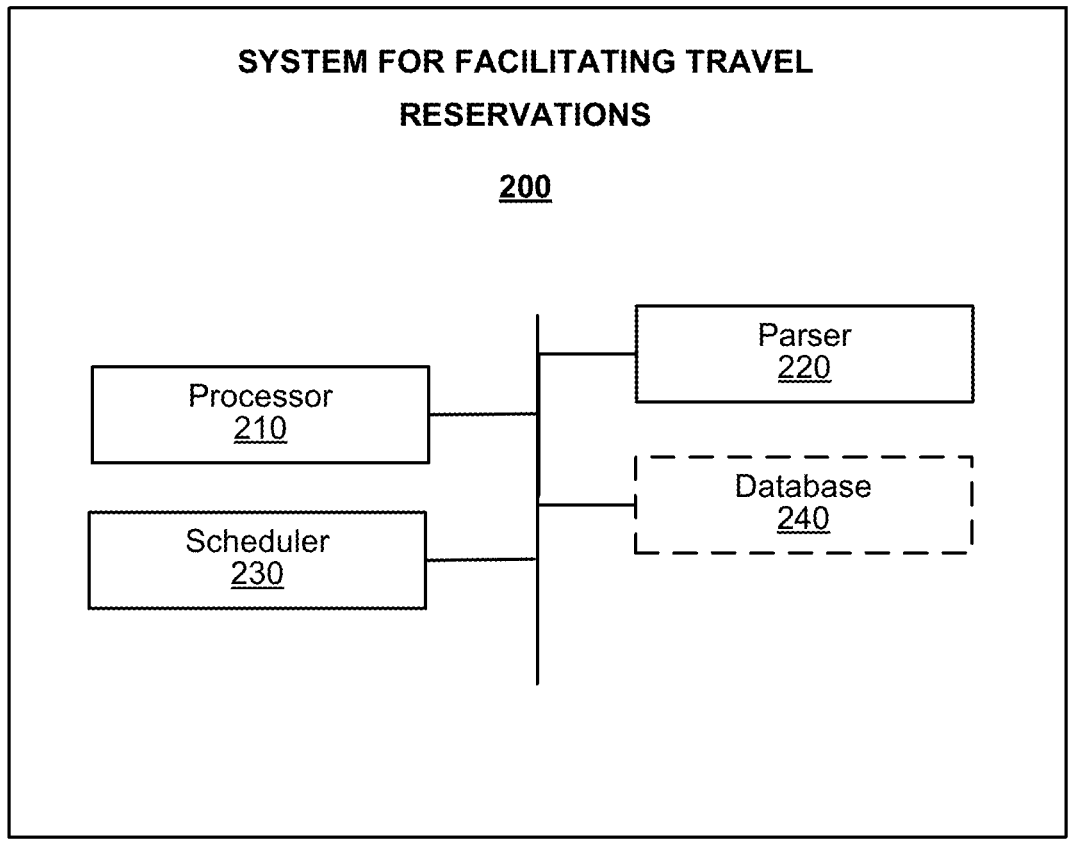
FIG. 2 is a block diagram showing various modules of the system for facilitating travel reservations.

FIG. 2 is a block diagram showing various modules of the system 200 for facilitating travel reservations, in accordance with certain embodiments. The system 200 may comprise a processor 210, a parser 220, a scheduler 230, and an optional database 240. The processor 210 may include a programmable processor, such as a microcontroller, central processing unit (CPU), and so forth. In other embodiments, the processor 210 may include an application-specific integrated circuit (ASIC) or programmable logic array, such as a field programmable gate array, designed to implement the functions performed by the system 200.

The processor 210 may receive a travel related query. The travel related query may be provided by a user. Moreover, the travel related query may be provided using a natural language, a typed text, a selection of preexisting options, and so forth. The processor 210 may ascertain an attribute set relevant to the travel related query.

The parser 220, being in communication with the processor 210, may be operable to parse the travel related query to derive attribute values related to the attribute set. The parser 220 may be further operable to initiate the at least one attribute of the attribute set with the derived attribute values.

Thereafter, the processor 210 may rank at least one attribute based on user preferences. The user preferences may be determined based on the travel related query. Additionally, the user preferences may be determined based on preexisting selections (for example, selections made by the user in a user profile associated with the system 200). The preexisting selections may be received from the user using a man-machine interface. Based on the ranking, the processor 210 may assign weights to the at least one attribute to create at least one weighted attribute.

The scheduler 230 may be operable to search for the feasible travel itineraries based on the least one attribute and the user preferences. The scheduler 230 may score the feasible travel itineraries based on the at least one weighted attribute for each of the feasible travel itineraries.

Upon scoring the feasible travel itineraries, the processor 210 may present at least one travel itinerary selected from the feasible travel itineraries based on the scoring. Additionally, the at least one travel itinerary and corresponding scores may be visualized to the user.

The optional database 240 may be configured to store at least data related to the travel related query, the user preferences, and so forth.

Thus, the system 200 may be operable to customize, for each individual traveler, how travel itinerary options are identified and presented for purchase consideration. Furthermore, the choices, namely the travel itineraries, may be presented to the user in ways that minimize search cost and maximize path-to-purchase efficiency.

Figure 3:
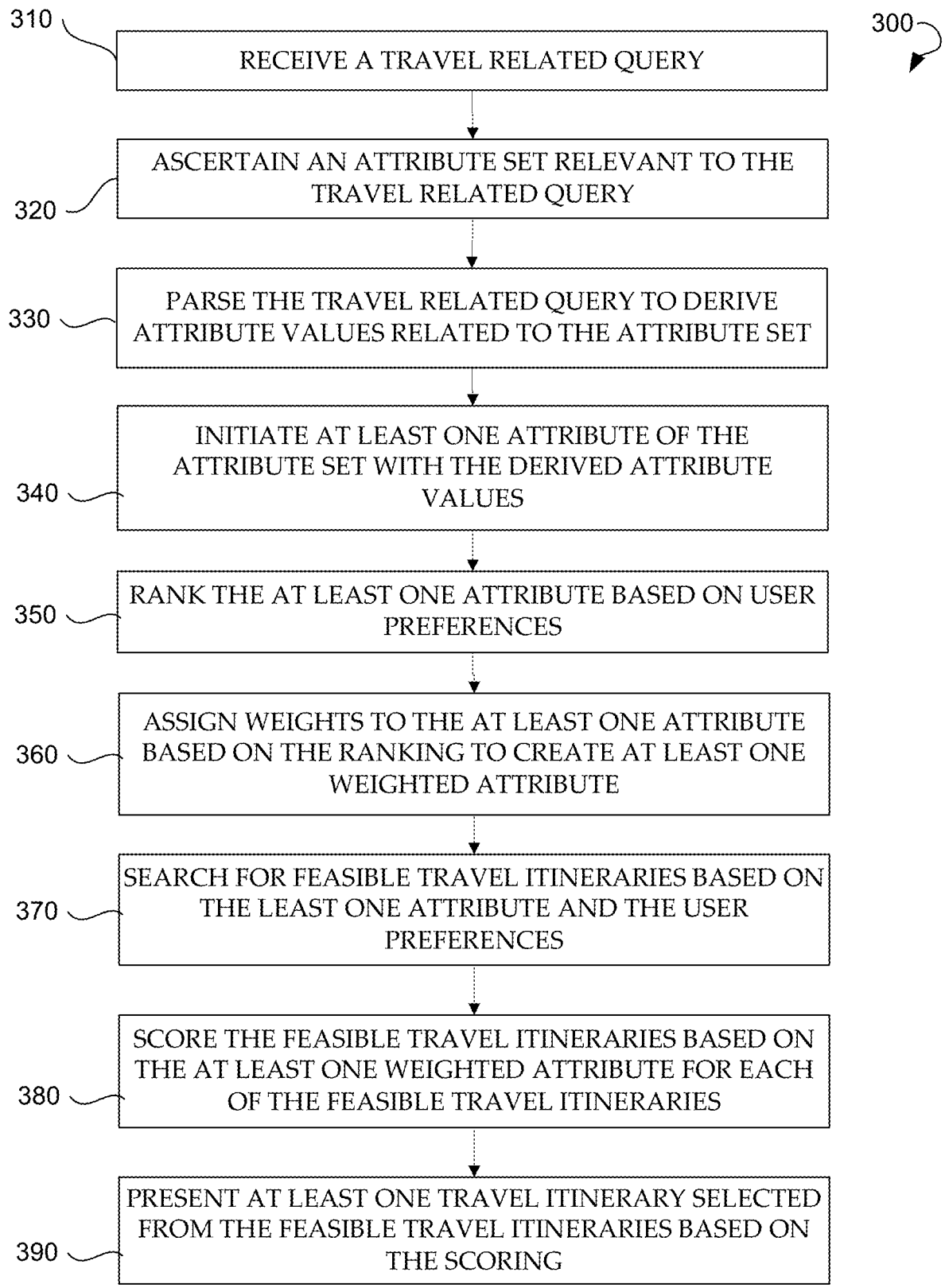
FIG. 3 is a process flow diagram showing a method for facilitating travel reservations.

FIG. 3 is a process flow diagram showing a method 300 for facilitating travel reservations within the environment described with reference to FIG. 1. The method 300 may commence with receiving a travel related query at operation 310. In an example embodiment, the travel related query may be provided via at least one of the following: a natural language, a typed text, a selection of preexisting options, and so forth. In a further example embodiment, the travel related query may be associated with a group of users.

The method 300 may continue with ascertaining an attribute set relevant to the travel related query at operation 320. At operation 330, the method may include parsing the travel related query to derive attribute values related to the attribute set.

Upon the parsing, at least one attribute of the attribute set may be initiated with the derived attribute values at operation 340. In an example embodiment, the at least one attribute with one possible value is a necessarily satisfied condition.

At operation 350, the at least one attribute may be ranked based on user preferences. In an example embodiment, the user preferences may be determined based on the travel related query. In another example embodiment, the user preferences may be determined based on preexisting selections.

The method 300 may optionally comprise providing a man-machine interface to receive the preexisting selections from a user. More specifically, the method 300 may include a front-end instantiation of user preferences, where the user preferences are obtained by parsing the semantic intent underlying the travel related query. The method 300 may further include a back-end specification of the user preferences by reading user-specified rank-order preference information (i.e., the preexisting selections) from a database (for example, the preference information related to airlines, hotels, etc.).

The method 300 may continue with operation 360, at which weights may be assigned to the at least one attribute based on the ranking. Thus, at least one weighted attribute may be created.

At operation 370, the method 300 may include searching for feasible travel itineraries based on the least one attribute and the user preferences. Upon the search, the feasible travel itineraries may be scored at operation 380. The scoring may be based on the at least one weighted attribute for each of the feasible travel itineraries. In example embodiments, the method 300 may optionally include adjusting the scoring based on forecasted weather conditions at a time of travel.

Upon scoring, the method 300 may continue with operation 390, at which at least one travel itinerary selected from the feasible travel itineraries based on the scoring may be presented. In example embodiments, the presenting of the at least one travel itinerary may be performed within a predetermined time after the receiving of the travel related query. The method 300 may further optionally include visualizing the at least one travel itinerary and corresponding scores.

The method 300 may be directed to determining how the utility, or value, the consumer derives from a given travel itinerary is characterized and evaluated. This utility may be derived from the defining elements of each travel itinerary (e.g., flight characteristics, such as class of service, etc.). Thus, the method 300 may be used for prioritizing and ranking itinerary options.

The operations of the method 300 and elements of the system 200 are further described in detail below.

Specification of Relevant Attribute Sets

The system for facilitating travel reservations may support a travel lexicon to accommodate and fulfill a wide range of possible travel related query. Therefore, within the system, the travel related queries can be expressed via natural language (typed or spoken). The system may be operable to support basic travel queries, Q, which take the form of $$Q=\{q_s,q_d,q_t\}, \text{ where}$$

$q_s$=starting point (airport, city, etc.); $q_d$=final destination; $q_t$=duration of trip.

Each travel query, Q, can be contextualized or made more specific via attributes that are instantiated via the travel related query in natural language. Accordingly, the system may be operable to identify and specify attribute sets that are relevant to the travel related query (which, in fact, relates to goals and objectives expressed by the user in the travel related query). It is possible to reason about whether the goals and objectives are met in terms of attribute values. In the context of a travel itinerary, attribute values may include the desire for an aisle seat, a non-stop flight, and the like. Therefore, the system can be used to find a means by which it is possible to reason whether the travel itinerary is capable of providing specified attribute values.

Therefore, the processor of the system is operable to define relevant attribute sets (RAS) that are linked/tied to context-defining attribute values specified in the given travel query, Q. The attribute sets may pertain, specifically, to flights (F), hotels (H), and origin (O) and destination (D), and may be defined as follows:

$$RAS(Q,F)=\{f \in F | isRelevant\_Flights(f,Q)=true\};$$

$$RAS(Q,H)=\{h \in H | isRelevant\_Hotels(h,Q)=true\};$$

$$RAS(Q,O)=\{o \in O | isRelevant\_O\&D(o,Q)=true\}.$$

In the characterization above, isRelevant_Flights is a logical predicate that asserts that attribute f is relevant for travel related attribute values specifiable in the travel related query, Q. Similar interpretations hold for the predicates isRelevant_Hotels and isRelevant_O&D.

Thus, the relevant attribute sets may be specified for flights, hotels, and origin and destination (O&D), respectively. For example, the RAS for Flights, RAS(Q, F), covers five attributes that may be supported within the travel lexicon of the parser of the system. These attributes, and their possible values, are shown in table 1 below.

TABLE 1

| RAS-Flights | Attribute Name | Values |
|---|---|---|
| $F_1$ | Carrier | Air Canada, American Airlines, et al. |
| $F_2$ | Number of Stops | {0, 1, 2} |
| $F_3$ | Class of Service | Economy, Economy-Refundable, Business-Restricted, Business-Unrestricted |
| $F_4$ | Equipment | Airbus, Boeing, Embraer, et al. |
| $F_5$ | Desired Departure/Arrival Time | Local Time, relative to consumer's origin; time at Desired Destination |

The RAS for hotels, RAS(Q, H), are shown in table 2 below and may include five attributes that are typically encountered in hotel searches.

TABLE 2

| RAS-Hotels | Attribute Name | Values |
|---|---|---|
| $h_1$ | Hotel Chain | Hilton, Marriott, et al. |
| $h_2$ | Star Rating | {0, 1, 2, 3, 4, 5, 6, 7} |
| $h_3$ | Smoking Preference | Y/N |
| $h_4$ | Bed Type | Twin, King, etc. |
| $h_5$ | Hotel Name | Local Time (relative to User's IP address) |

Finally, the RAS for O&D, RAS(Q, H), is shown in table 3 below and may enable the consumer to specify a country, city, city code, or airport code in a given travel request.

TABLE 3

| RAS-O&D | Attribute Name | Values |
|---|---|---|
| $o_1$ | Country | Argentina, United States, United Kingdom, et al. |
| $o_2$ | City | London, Toronto, Washington, et al. |
| $o_3$ | City Code | WAS, et al. |
| $o_4$ | Air Port Code | AUS, BOI, SEA, et al. |

Parser-Enabled Instantiation of Attributes

As mentioned above, the capabilities of the system can be utilized to contextualize and add specificity to travel related requests, thereby enabling the consumer to explicitly specify sought after or desired attribute values. The RASs defined above make it possible to operationalize the "front-end" and "back-end" integration discussed above. In this regard, it may be explored what this front-end portion means for any set of the attributes contained in each RAS to be activated or instantiated within the context of a given travel related query, Q.

Generally speaking, the fulfillment of a travel related query may require the instantiation of one or more attributes. These instantiated attributes enable adding context or specificity to the travel related query. For this purpose, the Cartesian product, Z, of three relevant attribute sets may be defined:

$$Z = F \times H \times O,$$

which, given the specifications for F, H, and O, above, gives rise to the following ordered n-tuple:

$$z = (f1, f2, f3, f4, f5, h1, h2, h3, h4, h5, o1, o2, o3, o4). \quad (1)$$

If vector notation is used and if $F = [f_1, f_2, f_3, f_4, f_5]$, $H = [h_1, h_2, h_3, h_4, h_5]$, and $O = [o_1, o_2, o_3, o_4]$, then Equation (1) can be expressed succinctly as follows:

$$Z = [F, H, O]. \quad (2)$$

In the context of a given travel related query, Q, Equations (1) and (2) can be used for representing those attributes that are instantiated within the travel related query. Some of the travel attributes may be instantiated on a continuing basis, in that the attributes may represent characteristic features of any feasible travel itinerary (e.g., every travel itinerary containing flights can be characterized by one or more air carriers, and so forth).

For the purpose of this disclosure, it can be assumed that instantiability is binary-valued. The space of all possible instantiations of the attributes is of order $2^n = 2^{14}$, and is defined as the cross product of the binary-valued state space associated with each individual attribute.

This scheme describes which travel attributes matter to the consumer. In general, the more attributes that are ascertained, the more specific the travel related query is. Therefore, the travel related query may be assumed to be closed with respect to a given RAS and a given query, Q, if all the attributes contained within the set of attributes are instantiated. Conversely, the travel related query may be assumed to be open if only a partial (possibly empty) subset of travel attributes is ascertained.

Further, let Z(Q) denote a query-driven set of ascertained attributes, and '*' denote those attributes that are non-ascertained. Therefore, a query-driven set of the ascertained attributes may be represented as follows:

$$Z(Q) = (f_1, f_2, *, *, f_5; h_1, *, *, h_4, *; *, *, *, o_4). \quad (3)$$

In Equation (3), query Q ascertains three of our travel related attributes: $f_1$, $f_2$, and $f_5$ (i.e., the natural language request specifies user preferences pertaining to 'Carrier,' 'Number of Stops,' 'Class of Service,' and 'Desired Departure Time'). The query Q also ascertains hotel-related attributes pertaining to 'Hotel Chains' and 'Bed Type,' together with the origin and destination attribute pertaining to 'Airport Codes.' Therefore, for the travel related attributes, Equation (3) is open with respect to attributes 3 and 4; for the hotel attributes, Z(Q) is open with respect to attributes 2 and 3; and for the origin and destination attributes, the travel related query is open with respect to attributes 1, 2, and 3.

Multiattribute Formulation—Preliminaries

The system further utilizes the RASs specified above to associate a determinate value with each travel itinerary as a function of the ascertained attributes that are associated with a given travel related query. In this way, each feasible itinerary may be characterized in terms of a single, aggregate (dimensionless) value, which may be used to prioritize and rank itinerary attributes.

The key elements for performing prioritizing and ranking may include: a finite number of travel itineraries, $\mathcal{A}$; a finite number of attributes, I; a weight, $w_i$, for each attribute i∈I; a value score for each attribute and itinerary, $v_i(a)$, for itinerary a∈$\mathcal{A}$ and attribute i∈I; and total value, V, of itinerary a∈$\mathcal{A}$ defined as the weighted sum $$\Sigma_i w_i v_i(a).$$

Alternatively, using the vector notation introduced earlier, the total value of an itinerary choice set is succinctly expressed as $$V(F,H,O) = \Sigma wv(\bullet),$$

where w denotes vector tradeoff weights for F, H, O. For ease of analysis and exposition, it is convenient to also assume that $$\forall i \in I, w_i \geq 0 \text{ and } \Sigma_i w_i = 1$$

$\forall a \in \mathcal{A}$ and $i \in I$, $v_i(a) \in [0,1]$ for each $i \in \mathcal{A}$, there are a', $a'' \in \mathcal{A} \ni$ $$v_i(a')=1 \text{ and } v_i(a'')=0;$$

itinerary a' is at least as preferred as itinerary a" if $wv(a') \geq wv(a'')$.

The next step is to integrate front-end attribute ascertaining and back-end-specified consumer preferences. This may require some mathematical preliminaries described below.

Mathematical Preliminaries

As discussed earlier, it is necessary to take into consideration the relationship between a "front-end" of the system (where parser-enabled attribute instantiations occur) and a "back-end" of the system (where consumers provide profile information that contains preference information). For this purpose, permutations on lexicographically ordered finite sets can be used, where each permutation contains information pertaining to the rank-order preferences of the consumer (for example, for airlines, hotels, and the like).

The back-end-specified rank-order preference information can be utilized to impute numerical values which serve as the primary means by which numeric specifications for the value functions may be determined: $v_i(a)$.

The concept of a permutation can enable explicitly referencing/indexing rank-order preference data obtained via "user profiles" on the back-end of the system. For this purpose, let S denote a finite set consisting of n elements:

$$S = \{x_1, x_2, \ldots, x_n\}.$$

For ease of exposition and analysis, the restriction can be imposed that the elements of S are lexicographically ordered such that $$x_1 \leq x_2 \leq \ldots \leq x_n.$$

The kind of permutation, $\pi$, is a bijection, i.e., a one-to-one and onto function from S onto itself:

$$\pi: S \to S.$$

Example 1

Let $S = \{x_1, x_2, x_3, x_4, x_5\}$, with the following illustrative graph of $\pi$: $\pi(x_1) = x_2$, $\pi(x_2) = x_3$, $\pi(x_3) = x_1$, $\pi(x_4) = x_5$, and $\pi(x_5) = x_4$. This permutation can be expressed in matrix form as $$\pi = \begin{pmatrix} x_1 & x_2 & x_3 & x_4 & x_5 \\ x_2 & x_3 & x_1 & x_5 & x_4 \end{pmatrix} \quad (4)$$

If the lexical order described above is treated as fixed, the permutation can be expressed in its simpler Cartesian form:

$$\pi = [x_2, x_3, x_1, x_5, x_4]. \quad (5)$$

Example 2

As a travel-specific example, there are the following 5 airlines, listed in alphabetical order in table 4:

TABLE 4

| Lexical Element | Airline |
|---|---|
| x1 | American |
| x2 | Jet Blue |
| x3 | Southwest |
| x4 | United |
| x5 | Virgin America |

The consumer may provide the following rank-order preference information for this set of airlines:

Virgin America>Southwest>United>American>Jet Blue.

This preference ordering can be representable by:

$$\pi = [5, 3, 4, 1, 2]. \quad (6)$$

This example can be generalized to an arbitrary n:

$$\pi = [i_1, i_2, \ldots, i_n], \quad (7)$$

where $\pi \in S_n$ and $\pi(x_1) = x_{i_1}$, $\pi(x_2) = x_{i_2}$, ..., $\pi(x_n) = x_{i_n}$.

Imputation of Marginal Value Functions Via Rank-Ordered Preferences

Equation (7) can be utilized to encode preference information concerning air carriers, hotels, and the like. As described below, each permutation vector is used to impute numerical weights of relative importance or value for these vector elements. For the purposes of this disclosure, two numerical approaches can be utilized, namely rank sum and rank reciprocal.

Rank Sum (RS).

N attributes or lexicographically ordered elements are ranked, and each attribute is weighted according to the formula, $$w_i = \frac{N - r_i + 1}{\Sigma_j (N - r_j + 1)}, \quad (8)$$

where $r_i$ is the rank position of the attribute or element.

Rank Reciprocal (RR).

Weights are derived from the normalized reciprocals of $$w_i = \frac{1/r_i}{\Sigma_j (1/r_j)}. \quad (9)$$

a rank of the attribute or element:

Example 3

Applying Equations (7), (8), and (9) to the airline of Example 2 yields the numerical values shown in table 5 below.

TABLE 5

| Airline | Rank | RS Weight | RR Weight |
|---|---|---|---|
| American | 4 | 0.133 | 0.109 |
| Jet Blue | 5 | 0.067 | 0.088 |
| Southwest | 2 | 0.267 | 0.219 |
| United | 3 | 0.200 | 0.146 |
| Virgin America | 1 | 0.333 | 0.438 |

Indexing the Multiattribute Value Model

Within the context of a given travel related query, only the attributes that are instantiated are taken into consideration.

Therefore, the instantiated attributes need to be indexed. To this end, a travel related query, Q, gives rise to a vector Z(Q) of instantiated attributes. For example, the travel related query, Q, generates the following attribute instantiations:

$$(f_1, f_2, *, *, f_5; h_1, *, *, h_4, *; *, *, *, o_4),$$

in which case $$Z(Q) = (f_1, f_2, f_5; h_1, h_4, o_4). \quad (10)$$

From Equation (10), three index sets can be extracted, which enable indexing multiattribute aggregation model:

$$I_F = \{1, 2, 5\}$$

$$I_H = \{1, 4\}$$

$$I_O = \{4\}.$$

In more general terms, the index sets illustrated above can be defined as follows:

$$I_F = \{i | i \in F \text{ and } f_i \in Z(Q) = \text{true}\}; \quad (11)$$

$$I_H = \{j | j \in H \text{ and } h_j \in Z(Q) = \text{true}\}; \quad (12)$$

$$I_O = \{k | k \in O \text{ and } o_k \in Z(Q) = \text{true}\}; \quad (13)$$

Having properly indexed the instantiated attributes that the travel related query, Q, gives rise to, the multiattribute aggregation model described earlier can be specified in the specialized form that its application here requires:

$$V_Q(F, H, O) = \sum_{i \in I_F} w_i e_{f_i}(\cdot) + \sum_{j \in I_H} w_j v_{h_j}(\cdot) + \sum_{k \in I_O} w_k v_{o_k}(\cdot). \quad (14)$$

The linear additive nature of Equation (14) enables using the portions of the aggregation model that are required by the travel related query, Q. For example, the travel related query that only requests a flight itinerary will utilize only the first of the three summations shown in Equation (14).

The numerical specification of Equation (14) is essentially a two-step process and includes a specification of the relevant single attribute value functions $v_{fi}(\cdot)$, $v_{hj}(\cdot)$, and $v_{ok}(\cdot)$, and a specification of the (scaling) weights $w_i$, $w_j$, and $w_k$. Each of these elements can be considered in turn.

Specification of Single-Attribute Value Functions—Flights

In specifying the single-attribute value functions, $v_{fi}(\cdot)$ associated with flights, there is reason to presume the existence of a set, $\mathcal{A}$, of feasible itinerary solutions (FISs), comprised of elements $a_1, a_2, \ldots, a_m$. In the case of a travel related query, each travel itinerary $a_i \in \mathcal{A}$ is evaluated on attributes $F_1, \ldots, F_m$ and a marginal value function, $v_i(f_{ij})$, on the performance $f_{ij}$ of the travel itinerary $a_i$ under attribute Fj. Each of these five travel related attributes is considered below.

Carrier ($F_1$).

This attribute captures the preferences of the consumer related to an airline carrier. In the context of travel related queries, this attribute exists on a continuous basis, in the sense that every itinerary that involves air travel is characterized by a determinate carrier value.

In formally characterizing this attribute, it is distinguished between two types of travel related requests: those where the consumer expresses an explicit, named preference for one or more airlines (e.g., "Please show me all of the United flights from IAD to SFO for Friday"; "Can I see what Virgin or American flights I can take next Monday to London?", etc.) and those where no such preference is expressed. From a consumer choice perspective, the request for a specific carrier (or set of carriers) acts as a filter: if the scheduler is able to return one or more feasible solutions that satisfy the travel related query, then those travel itinerary options are presented to the consumer for consideration, and the multiattribute value model is invoked only if other travel related attributes in RAS(Q, F) have been instantiated.

In all other instances involving travel related queries, each feasible itinerary solution $a_i \in \mathcal{A}$ must be evaluated on attribute $F_1$. To this end, the marginal value function $v_1(f_{i1})$ needs to be characterized and evaluated on the performance $f_{i1}$ of itinerary $a_i \in \mathcal{A}$ under this attribute. Equation (14) serves as the basis for a numeric scheme that enables the single-attributed scoring of each feasible itinerary solution yielded by the Scheduler, as measured by the Carrier attribute.

Since the number of carriers is finite, it can be assumed that $F_1$ is characterized by a finite domain $D_{F1}$. Numeric characterization of the marginal value function can proceed along several possible lines. It is possible to envision systematic attempts at the elicitation of consumer preferences regarding air carriers. Alternatively, it is also possible to envision schemes whereby these carrier preferences are learned over time in a systematic manner. The approach adopted herein exploits the existence of stated preference information provided on the back-end of the system. This information takes the form of rank-order preference data concerning air carriers, and this data is used, in conjunction with the RS and RR equations described earlier, to arrive at a numeric characterization for $v_1(f_{i1})$.

Furthermore, the existence of a set, C, consisting of a lexically-ordered set of air carriers is presumed:

$$C = \{C1, C2, \ldots, Cn\}.$$

Given this set, the existence of a permutation vector, $n_c$, is presumed, and the vector encodes rank-order preference information for the air carriers contained in C:

$$\Pi_c = [\pi_c^1, \ldots, \pi_c^n].$$

Equation (8) can now be re-written as follows:

$$w_i^c = \frac{n - \pi_c^i + 1}{\sum_j (n - \pi_c^j + 1)}, \quad i = 1, \ldots, n \quad (15)$$

which provides a rank-order-derived importance weight, $w^c_i$, for carrier i.

Further, each travel itinerary $\mathcal{A} = \{a1, \ldots, a2\}$ is scored on attribute $F_1$. It is assumed that each travel related itinerary $a_i \in \mathcal{A}$ is characterized by a determinate carrier value $x_{ij}^k = x_{ij}^1 = c_i \in C$, where i indexes travel itineraries (i.e., i=1, \ldots, m), j indexes carriers (i.e., j=1, \ldots, n), and k indexes the instantiated (ascertained) attributes. Given this domain characterization, the marginal value function can be characterized as follows:

$$v_1(x_{ij}) = \begin{cases} w^c_{\pi_c^j}, & \text{if } a_i \in A \text{ and } x_{ij} \neq \phi \\ 0, & \text{otherwise} \end{cases},$$

where $w^c_{\pi_c^j}$ is the rank-order-derived weight, obtained via Equation (15), associated with carrier $\pi_c^j$, j=1, \ldots, n.

Number of Stops ($F_2$).

When instantiated, this attribute captures the consumer preferences for the number of leg segments contained within a given Origin and Destination city pair. Generally speaking, most travelers prefer less stops to more, but often this convenience comes at a cost (i.e., it increases the cost associated with an itinerary). For the purposes of this disclosure, this attribute is modeled as a constructed attribute, defined in terms of three attribute levels shown in table 6:

TABLE 6

| Attribute level | State |
| --- | --- |
| 0 | If Non-Stop |
| 1 | If 1-Stop |
| 2 | If 2-Stop |

The baseline parameterization for the single-attribute value function, $v_2(\bullet)$, is given as follows:

$v_2(0)=1$ $v_2(1)=0.7$ $v_2(2)=0.$

Figure 4:
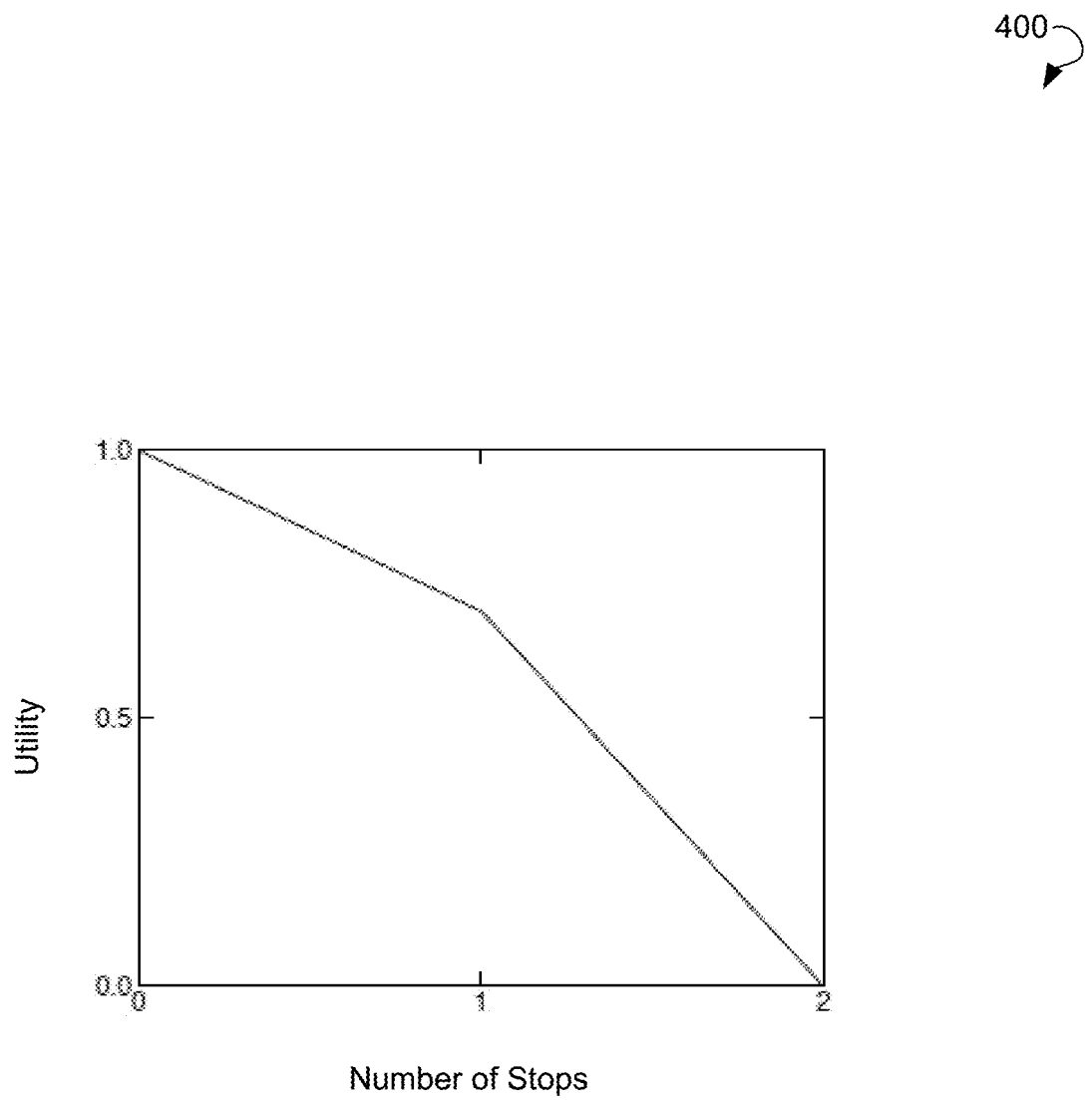
FIG. 4 illustrates dependency of utility of a travel itinerary on a number of stops.

FIG. 4 shows dependency of utility of the travel itinerary (namely, matching of the travel itinerary with the consumer preferences) on a number of stops of the travel itinerary.

Class of Service ($F_3$).

This attribute captures the consumer preferences for the specific classes of service offered by most airlines. When this variable is instantiated, the user is expressing a preference for a particular class of service. In looking, then, to measure the contribution to overall value that the instantiation of this attribute has on the overall value of a given itinerary, it is necessary to capture the conditional nature of this marginal value proposition. For this purpose, an "Ask/Get" matrix can be used, which, for the purposes of this disclosure, is defined as shown in table 7:

TABLE 7

|  | Economy | Econ.-Refundable | Bus.-Restricted | Bus.-Unrestricted |
| --- | --- | --- | --- | --- |
| "Economy" | 0.9 | 0.6 | 0.1 | 0 |
| "Econ.-Refundable" | 0.6 | 0.9 | 0.2 | 0 |
| "Bus.-Restricted" | 0 | 0.4 | 0.9 | 0.6 |
| "Bus.-Unrestricted" | 0.1 | 0.5 | 0.7 | 0.9 |

In Table 7, the column entries contained in quotes ("Economy," "Econ.-Refundable," "Bus.-Restricted," "Bus.-Unrestricted") denote the actual consumer-provided travel related query, whereas the row entries denote the class of service associated with a given itinerary, $a_i \in \mathcal{A}$. If, for example, the consumer asks for a "Business-Restricted" ticket, but the feasible itinerary choice is an Economy-Refundable ticket, then that itinerary is assigned a weight of 0.4.

Equipment ($F_4$).

This attribute becomes instantiated when the consumer expresses an explicit equipment-related preference. The consumer may, for example, request a wide-body plane (e.g., an A380, A340, etc.). Within the parser, such travel related query can be invoked at various levels of aggregation, e.g., body type, model type, and so forth. For ease of analysis, $v_4(\bullet)$ is characterized an indicator variable, where a travel related query, Q, containing a specific equipment-related request gives rise to one or more travel itinerary options that either succeed or fail to satisfy the equipment request. Accordingly, the weight function is formally specified as follows:

$$v_1(x_i) = \begin{cases} 1, & \text{if for itinerary } a_i \in A, DesiredEquipment = \text{true} \\ 0, & \text{otherwise} \end{cases},$$

where DesiredEquipment is a logical predicate that returns a truth-value obtained via look-up tables (may be stored in the database) that define the relevant set of equivalence classes. For the purposes of this disclosure, for the wide/narrow body distinctions, the basic taxonomy supported within the parser is shown in table 8 below.

TABLE 8

| Wide Body Jet | Narrow Body Jet | Narrow Body Continued |
| --- | --- | --- |
| Airbus: 380, A330, A340, A350 | Airbus: A319, A320, A321 | Embraer: E170/5, E190/5, EMB120, ERJ145 family |
| Boeing: B787, B777, B767, B747, MD-11 | Boeing: B737, B757, MD83/90 | Bombardier: CRJ, Dash-8 |

For example, if the consumer requests, within a given query, a wide-body plane, and a travel itinerary contains any of the jets listed in the first column of table 8 above, then the weight function is assigned a value of 1; otherwise it is assigned a zero.

Desired Departure/Arrival Time ($F_5$).

Time factors into the travel plans and desires of most consumers. For example, typical requests may include the following: "I need to be in Los Angeles first thing Monday morning for a meeting"; "For my trip to New York, I'd like to arrive in New York in time to have dinner with Jonathan," and the like. The system has the ability to include attributes that allow capturing and representing these kinds of time-related preferences. Accordingly, two attributes that capture/represent preferences pertaining to desired departure and arrival times, respectively, can be used.

In the first of these two instances, preferences pertaining to a desired departure time (DDT) of consumer need to be captured. When instantiated, the DDT can be expressed precisely as a time of day (12- or 24-hour format), or as a time-period (e.g., "morning," "afternoon," "evening," or other possible sub-categories within these general categorizations). In practical terms, the marginal value function, $v_5(x_j)$, focuses on the relative duration of period between the departure time associated with the outbound flight (OF) associated with itinerary $a_i \in \mathcal{A}$, and the stated DDT.

The preference levels associated with $x_i$ can be specified in any number of ways. For the purposes of this disclosure, the following four attribute levels are specified in table 9:

TABLE 9

| Attribute Level | State |
| --- | --- |
| 0 | if N/A; |
| 1 | if the $OF_i$ for $a_i \in \mathcal{A}$ is within 1 hour of the DDT; |
| 2 | if, for $a_i \in \mathcal{A}$, 1-hr < |DDT - $OF_i$| < 2-hrs; |
| 3 | if, for $a_i \in \mathcal{A}$, |DDT - $OF_i$| > 2-hrs. |

This value function can be parameterized as follows:

$v_5(0)=0$ $v_5(1)=0.9$ $v_5(2) = 0.7$ $v_5(3) = 0.4.$

Furthermore, travel related queries that specify a desired arrival time (DAT) may be considered. In defining this attribute, as before, a constructed scale that measures the duration of period between the DAT of the consumer and the arrival time of a destination leg/flight (DF) of the travel itinerary is shown in table 10:

TABLE 10

| Attribute Level | State |
| --- | --- |
| 0 | If N/A; |
| 1 | if the $DF_i$ for $a_i \in \mathcal{A}$ is within 1 hour of the DAT; |
| 2 | if, for $a_i \in \mathcal{A}$, 1-hr < \|DAT - $DF_i$\| < 2-hrs; |
| 3 | if, for $a_i \in \mathcal{A}$, \|DAT - $DF_i$\| > 2-hrs. |

This value function can be parameterized as follows:

$v_5(0) = 0$ $v_5(1) = 0.9$ $v_5(2) = 0.7$ $v_5(3) = 0.4.$

Specification of Single-Attribute Value Functions—Hotels

The other attributes may include Hotel Chain, Star Rating, Smoking Preference, Bed Type, and the like.

For the Hotel Chain attribute ($h_1$), the indicator variable may be stated as follows:

$$v_{h_1} = \begin{cases} 0, & \text{if } x = N \\ 1, & \text{if } x = Y \end{cases}.$$

For the Star Rating attribute ($h_2$), the indicator variable may be stated as follows:

$\{0,1,2,3,4,5,6,7\}.$

For the Smoking Preference attribute ($h_3$), the indicator variable may be stated as follows:

$$v_{h_3} = \begin{cases} 0, & \text{if } x = N \\ 1, & \text{if } x = Y \end{cases}.$$

For the Bed Type attribute ($h_4$), the Ask/Get Matrix may be used as discussed above.

The Hotel Name attribute ($h_5$) may be instantiated when the consumer mentions a hotel by name. If the hotel is available, the attribute has utility; if the hotel is unavailable, then the attribute has little or no utility.

Other Single-Attribute Value Functions relating to Origin and Destination may include country ($o_1$), city ($o_2$), city code ($o_3$), airport code ($o_4$), and so forth.

Numerical Case Study. Case: Flights-Only Itineraries

In an example embodiment, a travel related query, Q, is passed through the analytic framework of the system specified above. The travel related query may read as follows: "Roy and Jonathan want to travel non-stop from Toronto to Seattle on March 21st; we want business class seats, if possible; if possible, it would be nice to get there early enough in the evening to have dinner at Daniel's Broiler in Bellevue; as always, we prefer a wide-body plane."

The travel related query instantiates the following flight attributes: $F_1$ (since a flight itinerary is desired), $F_2$ (since a non-stop flight is desired), $F_3$ (since business class seats are desired), $F_4$ (since a wide-body plane is preferred), and $F_5$ (since a desired arrival time—"Supper"="Evening"—is specified). Therefore, this travel related query is closed under F, and, via Equation (7), gives rise to the following index set:

$I_F = \{1,2,3,4,5\}.$

At least one of the travelers (for example, Roy) may preliminarily create, on the back-end of the system, a user profile that contains personal rank-order preferences of the traveler for air carriers. Therefore, airline preferences of this traveler may be captured. Furthermore, the traveler may also preliminarily provide the rank-order preference information regarding the travel related attributes. Given this set of rankings, it may be determined that, when evaluating travel itinerary selection, the traveler assigns highest importance to obtaining a desired cabin class, followed by trip duration. Using these rank-order preferences, Equation (15) can be used to impute the RS weights shown below in table 11:

TABLE 11

| RAS-Flights | Rank | Rank Sum Weight |
| --- | --- | --- |
| $F_1$ | 4 | 0.133 |
| $F_2$ | 2 | 0.267 |
| $F_3$ | 1 | 0.333 |
| $F_4$ | 5 | 0.067 |
| $F_5$ | 3 | 0.200 |

Figure 5:
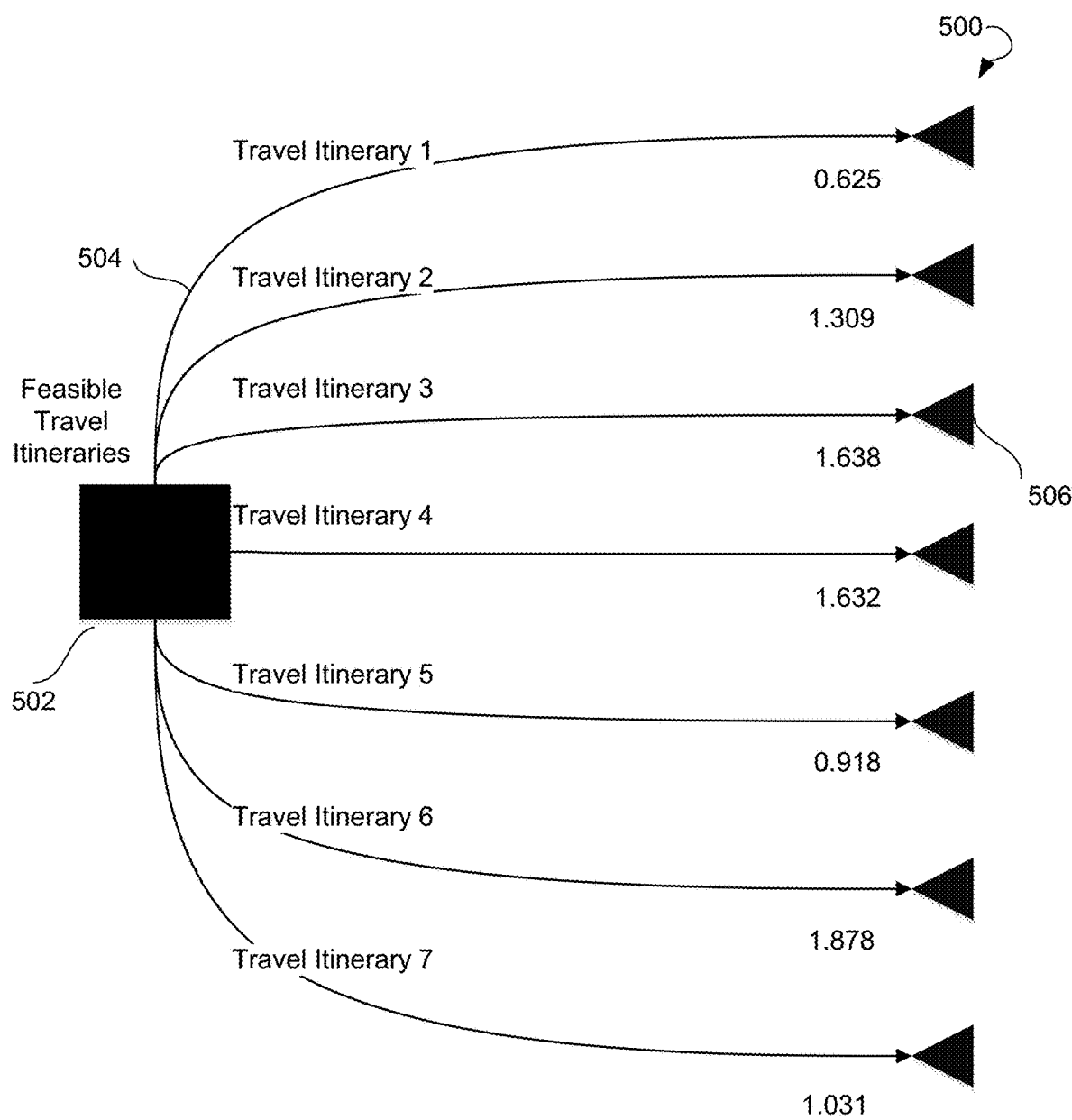
FIG. 5 is a graphical representation of travel itineraries found by a scheduler.

The scheduler may factor the preferences of the traveler into the search performed by the scheduler. FIG. 5. shows a representation 500 of travel itineraries found by the scheduler. In particular, the scheduler may perform the search in feasible travel itineraries 502. As a result of the search, travel itineraries 504 (shown as travel itineraries 1-7) may be found. Each of the travel itineraries 504 may have a weight 506.

Figure 6:
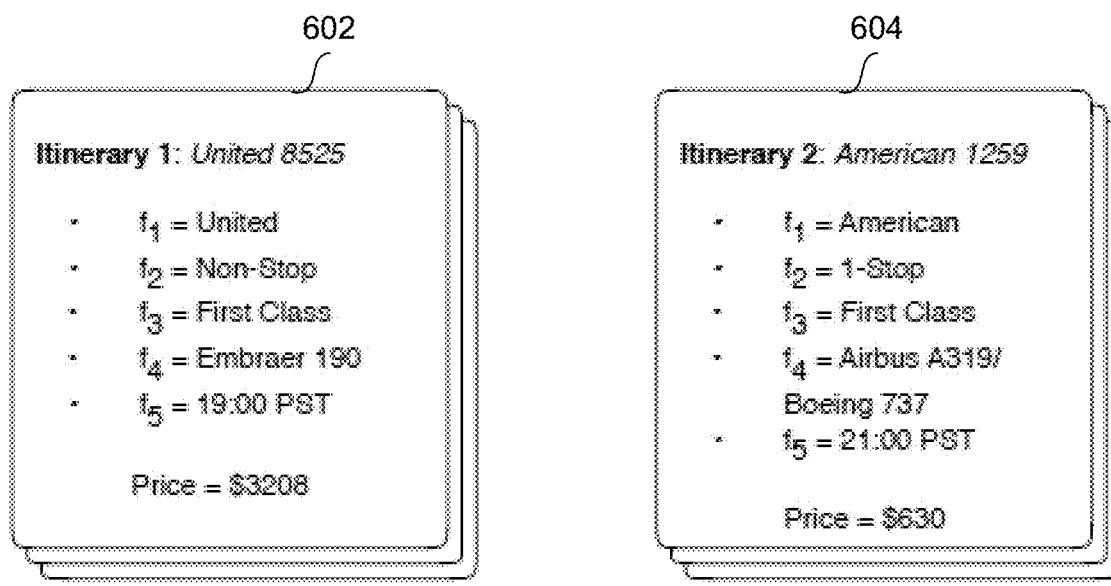
FIG. 6 shows results of a search performed by a scheduler.

The scheduler may return a result to the traveler. The result of the search is shown on FIG. 6. FIG. 6 shows a travel itinerary 602 and a travel itinerary 604. Each of the travel itinerary 602 and the travel itinerary 604 may have attribute values $f_1, f_2, f_3, f_4, f_5$.

Look-up tables stored in a database may be used to determine that the wide-body plane request is not satisfied in either of the travel itinerary 602 and the travel itinerary 604, and that the instantiated DAT is satisfied in the travel itinerary 602, but not in the travel itinerary 604.

Figure 7:
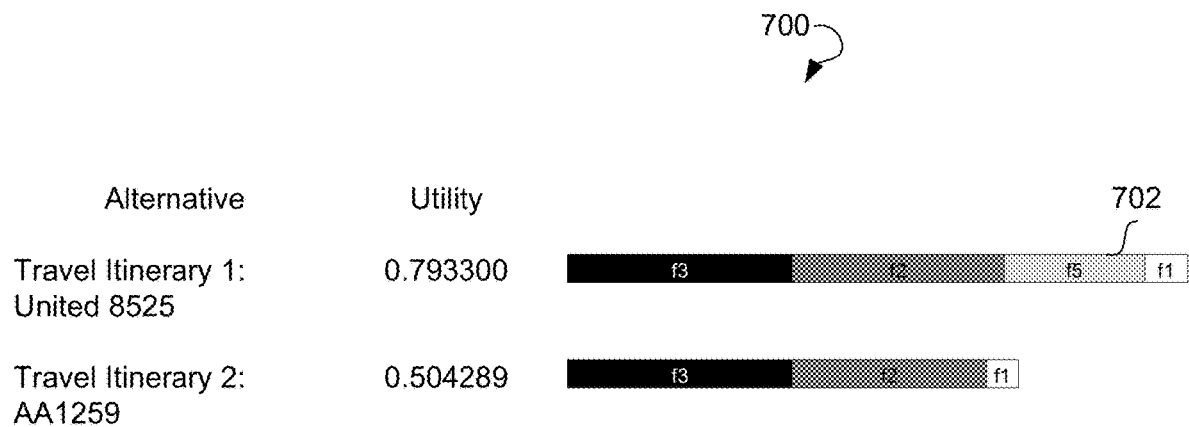
FIG. 7 illustrates a representation of numeric results of a search performed by a scheduler.

FIG. 7 shows an implementation 700 of the relevant portion of Equation (14), which yields the set of numeric results graphically illustrated below. As shown on FIG. 7, travel itinerary 1 (corresponds to travel itinerary 602 shown on FIG. 6) is ranked higher than travel itinerary 2 (corresponds to travel itinerary 604 shown on FIG. 6), primarily due to the fact that travel itinerary 1 scores better on the DAT attribute 702 (attribute $f_5$). Given rank-order importance ($3^{rd}$) of this attribute in overall ranking of flight attributes of the traveler, together with the fact that travel itinerary 2 is a 1-stop flight, these numeric results square with a decision of the desirability of travel itinerary 1 over travel itinerary 2.

Figure 8:
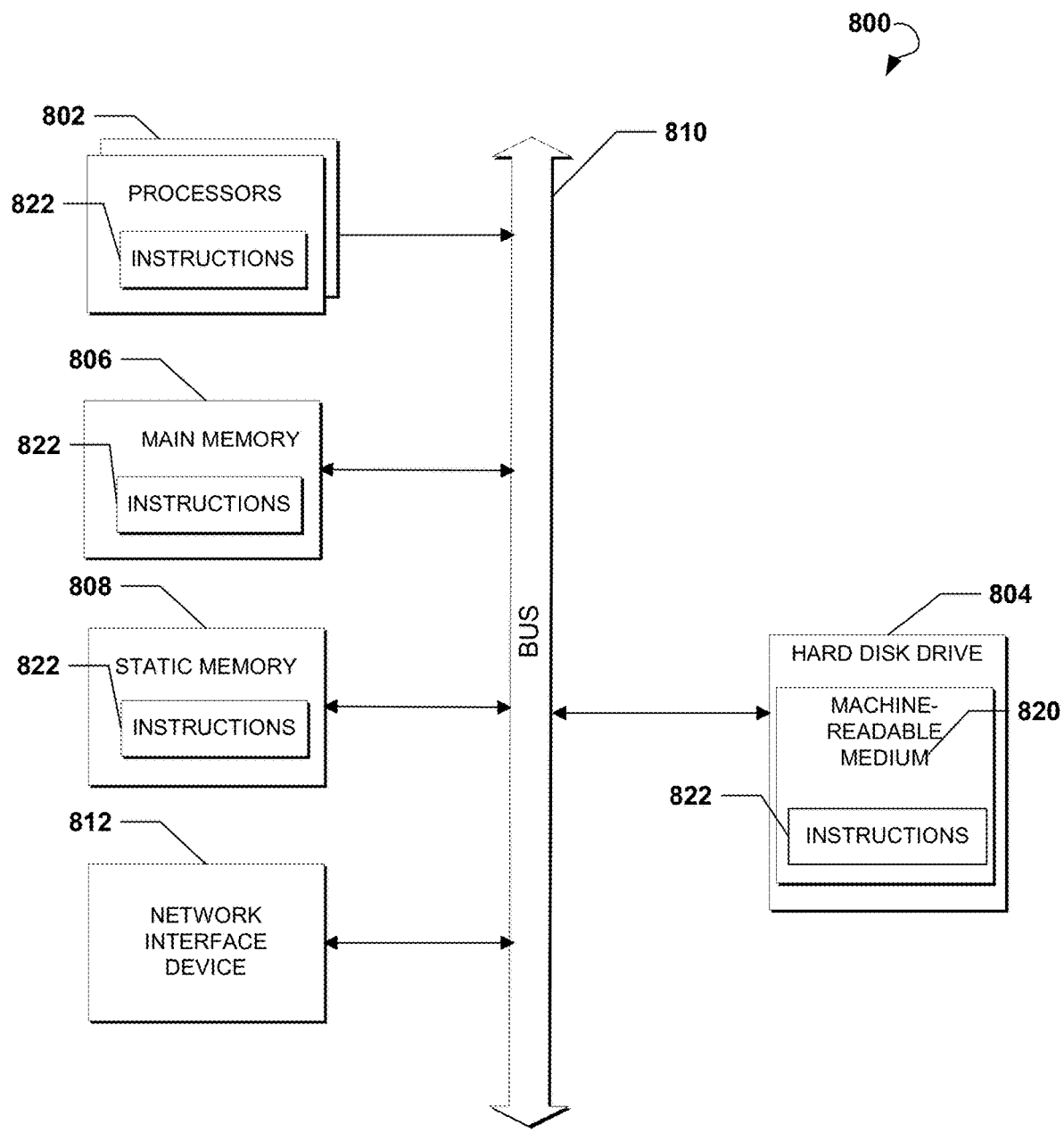
FIG. 8 shows a diagrammatic representation of a computing device for a machine in the exemplary electronic form of a computer system, within which a set of instructions for causing the machine to perform any one or more of the methodologies discussed herein can be executed.

FIG. 8 shows a diagrammatic representation of a computing device for a machine in the exemplary electronic form of a computer system 800, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as an Moving Picture Experts Group Audio Layer 3 player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor or multiple processors 802, a hard disk drive 804, a main memory 806, and a static memory 808, which communicate with each other via a bus 810. The computer system 800 may also include a network interface device 812. The hard disk drive 804 may include a computer-readable medium 820, which stores one or more sets of instructions 822 embodying or utilized by any one or more of the methodologies or functions described herein. The instructions 822 can also reside, completely or at least partially, within the main memory 806 and/or within the processors 802 during execution thereof by the computer system 800. The main memory 806 and the processors 802 also constitute machine-readable media.

While the computer-readable medium 820 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory (RAM), Read-Only Memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 800 may be implemented as a cloud-based computing environment, such as a virtual machine operating within a computing cloud. In other embodiments, the computer system 800 may itself include a cloud-based computing environment, where the functionalities of the computer system 800 are executed in a distributed fashion. Thus, the computer system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk, any other optical medium, any other physical medium with patterns of marks or holes, a RAM, a Programmable Read-Only Memory, an Erasable Programmable Read-Only Memory (EPROM), an Electrically Erasable Programmable Read-Only Memory, a FlashEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, computer-implemented methods and systems for facilitating travel reservations are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for facilitating travel reservations, the system comprising:
   a database in communication with a processor, the database having stored thereon:
      a travel lexicon having attribute names and related values for flights, hotels, origins, and destinations; and
      a travel taxonomy comprising look-up tables having logical relations, semantic relations between the attribute names and related values for flights, hotels, origins, and destinations, and predicates;
   a scheduler in communication with the processor and operable to:
      instantiate a plurality of travel attributes in terms of the travel lexicon that are relevant to a travel-related query, thereby generating a plurality of instantiated travel attributes;
      index the plurality of instantiated travel attributes, thereby generating an attribute index comprising a plurality of indexed travel attributes defined in terms of the travel lexicon; and
      search for feasible travel itineraries based on the plurality of indexed travel attributes, the feasible travel itineraries determined based on at least two weighted attributes and user preferences for a user;
   a parser in communication with the processor and operable to:
      parse the travel-related query to derive a vector function comprising at least two attribute values related to the plurality of indexed travel attributes by the semantic relations of the travel taxonomy; and
      ascertain a relevant attribute set for the travel-related query, the relevant attribute set comprising the at least two attribute values for the travel-related query selected from the plurality of travel attributes based on a context of the travel-related query in the travel taxonomy;
   the processor in communication with the database, the scheduler, and the parser, the processor operable to:
      receive the travel-related query from the user via a user device, the travel-related query comprising free text data obtained via at least one of a natural language oral exchange or a natural language typed text;
      receive the user preferences from at least one of the database, the user device, or a server, the user preferences including relative importances assigned to each of the plurality of travel attributes;
      translate and represent the user preferences as travel attributes in terms of the travel lexicon;
      rank the at least two attribute values related to the relevant attribute set based on encoded preference information derived from the user preferences, thereby generating a ranking that represents a relative importance of each attribute value related to the relevant attribute set;
      assign weights to each of the at least two attribute values based on the ranking to create the at least two weighted attributes for the relevant attribute set;
      associate a value to each of the feasible travel itineraries based on the at least two weighted attributes and a value score corresponding to a performance of the feasible travel itinerary under each of the at least two attribute values, the value score being modified by the user preferences represented as travel attributes, thereby generating rank-order preference data for preference information that is associated with the travel-related query;
      score the feasible travel itineraries based at least in part on the at least two weighted attributes for each of the feasible travel itineraries and associated rank-order preference data to create feasibility scores; and
      transmit the feasible travel itineraries and the feasibility scores to the user device to present, to the user via the user device, at least one travel itinerary selected from the feasible travel itineraries bases on the feasibility scores.

2. The system of claim 1, wherein the user preferences are determined based on preexisting selections of the user.

3. The system of claim 2, further comprising a man-machine interface to receive the preexisting selections from the user.

4. The system of claim 1, wherein the travel-related query is for a plurality of users.

5. The system of claim 1, wherein the processor is further configured to adjust the scoring of the feasible travel itineraries based on forecasted weather conditions at a time of travel.

6. The system of claim 1, wherein the presenting of the at least one travel itinerary is performed within a predetermined time after the receiving of the travel related query.

7. The system of claim 1, wherein the processor is further configured to visualize the at least one travel itinerary and corresponding scores.

8. A method for facilitating travel reservations by a computer processor in communication with a database having stored thereon (a) a travel lexicon having attribute names and related attribute values for flights, hotels, origins, and destinations, and (b) a travel taxonomy comprising look-up tables having logical relations, semantic relations between the attribute names and related values for flights, hotels, origins, and destinations, and predicates, the method comprising:

receiving a travel-related query from a user via a user device, the travel-related query comprising free text data obtained via at least one of a natural language oral exchange or a natural language typed text;

instantiating a plurality of travel attributes in terms of the travel lexicon that are relevant to the travel-related query, thereby generating a plurality of instantiated travel attributes;

indexing the plurality of instantiated travel attributes, thereby generating an attribute index comprising a plurality of indexed travel attributes defined in terms of the travel lexicon;

parsing the travel-related query to derive a vector function comprising at least two attribute values related to the plurality of indexed travel attributes by the semantic relations of the travel taxonomy;

ascertaining a relevant attribute set for the travel-related query, the relevant attribute set comprising at least two attribute values for the travel-related query selected from the plurality of travel attributes based on a context of the travel-related query in a travel taxonomy;

receiving user preferences for the user from at least one of the databases, the user device, or a server, the user preferences including relative importances assigned to each of the plurality of travel attributes;

ranking the at least two attribute values related to the relevant attribute set based on encoded preference information derived from the user preferences, thereby generating a ranking that represents a relative importance of each attribute value related to the relevant attribute set;

assigning weights to each of the at least two attribute values based on the ranking to create at least two weighted attributes for the relevant attribute set;

searching for feasible travel itineraries based on the plurality of indexed travel attributes, the feasible travel itineraries determined based on the at least two weighted attributes and the user preferences;

associating a value to each of the feasible travel itineraries based on the at least two weighted attributes and a value score corresponding to a performance of the feasible travel itinerary under each of the at least two attribute values, the value score being modified by the user preferences represented as travel attributes, thereby generating rank-order preference data for preference information that is associated with the travel-related query;

scoring the feasible travel itineraries based at least in part on the at least two weighted attributes for each of the feasible travel itineraries and associated rank-order preference data to create feasibility scores; and transmitting the feasible travel itineraries and the feasibility scores to the user device to present, to the user via the user device, at least one travel itinerary selected from the feasible travel itineraries based on the feasibility scores.

9. The method of claim 8, wherein the user preferences are determined based on preexisting selections of the user.

10. The method of claim 8, wherein the travel-related query is for a plurality of users.

11. The method of claim 8, further comprising adjusting the scoring of the feasible travel itineraries based on forecasted weather conditions at a time of travel.

12. The method of claim 8, wherein the presenting of the at least one travel itinerary is performed within a predetermined time after the receiving of the travel related query.

13. The method of claim 8 further comprising visualizing the at least one travel itinerary and corresponding scores.

14. The method of claim 8, wherein the at least one attribute having at least one of the derived attribute values is a necessarily satisfied condition.

\* \* \* \* \*